US012750944B2

(12) United States Patent
Sahai

(10) Patent No.: US 12,750,944 B2
(45) Date of Patent: Sep. 29, 2026

(54) NANOSTRUCTURE NANOPLASMONIC ACCELERATOR, HIGH-ENERGY PHOTON SOURCE, AND RELATED METHODS

(71) Applicant: The Regents of the University of Colorado, a Body Corporate, Denver, CO (US)

(72) Inventor: Aakash A Sahai, Parker, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 665 days.

(21) Appl. No.: 17/996,500

(22) PCT Filed: Apr. 19, 2021

(86) PCT No.: PCT/US2021/027919

§ 371 (c)(1),
(2) Date: Oct. 18, 2022

(87) PCT Pub. No.: WO2021/216424

PCT Pub. Date: Oct. 28, 2021

(65) Prior Publication Data

US 2023/0209698 A1 Jun. 29, 2023

Related U.S. Application Data

(60) Provisional application No. 63/080,055, filed on Sep. 18, 2020, provisional application No. 63/080,052, (Continued)

(51) Int. Cl.
*H05H 15/00* (2006.01)

(52) U.S. Cl.
CPC .................................. *H05H 15/00* (2013.01)

(58) Field of Classification Search
None
See application file for complete search history.

(56) References Cited

U.S. PATENT DOCUMENTS

| | | | | |
|---|---|---|---|---|
| 7,732,786 | B2 | 6/2010 | Gorrell et al. | |
| 2007/0257622 | A1 | 11/2007 | Gorrell et al. | |
| 2017/0099724 | A1* | 4/2017 | Tajima .................. | H05H 15/00 |

FOREIGN PATENT DOCUMENTS

| | | | |
|---|---|---|---|
| CN | 106770619 | A | 5/2017 |
| JP | 2011108579 | A | 6/2011 |
| WO | 2021216424 | A1 | 10/2021 |

OTHER PUBLICATIONS

Iijima, Helical Microtubules of Graphitic Carbon, Letters to Nature 354 (Nov. 7, 1991), https://www.nature.com/articles/354056a0 (Year: 1991).*

(Continued)

*Primary Examiner* — James Choi
(74) *Attorney, Agent, or Firm* — Dorsey & Whitney LLP

(57) ABSTRACT

A system is provided for accelerating charged particles and producing high energy photons. The system includes a nanostructure comprising at least one tube having a hollow core channel surrounded by a wall of a nanomaterial, e.g., comprising wall electrons and ions. The nanostructure is configured to interact with a beam of charged particle having a quasi-solid beam density, e.g., greater than $10^{18}$ $cm^{-3}$. The beam of charged particles gains energy or momentum at an average acceleration gradient, e.g., greater than 1 TeraVolt (TeV) per meter along a longitudinal direction, and undergoes focusing in a transverse direction to increase the density of the beam of the charged particles, e.g. by at least an order of magnitude.

30 Claims, 13 Drawing Sheets

Related U.S. Application Data filed on Sep. 18, 2020, provisional application No. 63/012,276, filed on Apr. 20, 2020.

(56) References Cited

OTHER PUBLICATIONS

Sahai, Excitation of a nonlinear plasma ion wake by intense energy sources with applications to the crunch-in regime, Physical Review Accelerators and Beams 20, 081004 (2017), https://journals.aps.org/prab/pdf/10.1103/PhysRevAccelBeams.20.081004 ( Year: 2017).*
Sahai et al., Nanostructured Tube Wakefield Accelerator, (Apr. 20, 2020) https://arxiv.org/pdf/2004.09452 (Year: 2020).*
Velasco-Santos et al., Naturally produced carbon nanotubes, Chemical Physics Letters vol. 373, Issues 3-4, May 20, 2003, pp. 272-276 (Year: 2003).*
Resta-López et al. Study of Ultra-High Gradient Acceleration in Carbon Nanotube Arrays, 9th International Particle Accelerator Conference IPAC2018 (2018) (Year: 2018).*
Shin et al., Feasibility of Continuously Focused T /m Channeling Acceleration With CNT-Channel, 6th International Particle Accelerator Conference IPAC2015 (2015) (Year: 2015).*
Jing et al., Electron acceleration through two successive electron beam driven wakefield acceleration stages, Nuclear Inst. and Methods in Physics Research, A 898 (2018) 72-76 (Year: 2018).*
International Search Report and Written Opinion for Application No. PCT/US2021/027919, dated Jul. 15, 2021.
Sahai et al. Nanostructured Tube Wakefield Accelerator. arXiv e-prints. [retrieved Jun. 21, 2021] <URL: https://arxiv.org/pdf/2004.09452.pdf> entire document.
Shin et al. "Ultra-High Gradient Beam-Driven Channeling Acceleration in Hollow Crystalline Media." Proc. 5th Int. Particle Accelerator Conf. (IPAC'14). Dresden, Germany, Jun. 2014, pp. 1512-1514. [retrieved on Jun. 21, 2021] Retrieved from the Internet.
Zhang, et al. Particle-in-cell simulation of x-ray wakefield acceleration and betatron radiation in nanotubes. Physical Review Accelerators and Beams 19, 101004 (2016) <URL: https://journals.aps.org/prab/pdf/10.1103/PhysRevAccelBeams.19.10104>.
Extended European Search Report issued in European Application No. 21793040.3, mailed on Oct. 6, 2023, 11 pages.
International Preliminary Report on Patentability issued in International Application No. PCT/US2021/027919, mailed on Oct. 25, 2022.
Sahai , et al., "Solid-State Tube Wakefield Accelerator Using Surface Waves in Crystals", International Journal of Modern Physics, vol. 34, No. 34, 22 pages, Aug. 2019.
Shin, "Carbon nanotube accelerator—Path toward TeV/m acceleration: Theory, experiment, and challenges", International Journal of Modern Physics A: Particles & Fields; Gravitation; Cosmology; Nuclear Physics, vol. 34, 2019.
Tajima, et al., "Workshop on Beam Acceleration in Crystals and Nanostructures", Proceedings of the Workshop, Jun. 24-25, 2019, 259 pages, Fermilab.
Office Action issued in Japanese Patent Applicaiton No. 2023-507359, mailed on Feb. 4, 2025, 40 pages including 21 pages of machine English translation.
Adli, et al., "Acceleration of Electrons in the Plasma Wakefield of a Proton Bunch", Nature, vol. 561, pp. 363-367, Sep. 20, 2018, Springer.
Amelino-Camelia, et al., "Potential Sensitivity of Gamma-Ray Burster Observations to Wave Dispersion in Vacuo", Nature, vol. 393, No. 6687, pp. 763-765, Jun. 1998.
Anderson, et al., Proceedings of PEARC17, Jul. 9-13, 2017, New Orleans, LA.
Arber, et al., "Contemporary Particle-in-Cell Approach to Laser-Plasma Modelling", Plasma Phys. Control. Fusion, vol. 57, 26 pages, 2015, IOP Publishing Ltd, United Kingdom.
Benedetti, "Giant Collimated Gamma-Ray Flashes", Nature Photonics, vol. 12, No. 6, pp. 319-323, Jun. 2018.
Bohm, et al., "A Collective Description of Electron Interactions: III. Coulomb Interactions in a Degenerate Electron Gas", Physical Review, vol. 92, No. 3, pp. 609-625, Nov. 1, 1953.
Caldwell, et al., "Proton Driven Plasma Wakefield Acceleration", Nature Physics, vol. 5, No. 5, pp. 363-367, May 2009.
Chen, et al., "A Solid State Accelerator", SLAC—Pub, No. 4042, Aug. 21-27, 1986, Madison, WI.
Chen, et al., "Acceleration of Electrons by the Interaction of a Bunched Electron Beam with a Plasma", Physical Review Letters, vol. 54, No. 7, pp. 693-696, Feb. 18, 1985.
Chiou, et al., "High Beam Quality and Efficiency in Plasma-Based Accelerators", Physical Review Letters, vol. 81, No. 16, pp. 3411-3414, Oct. 19, 1998.
Ellis, et al., "Derivation of a Vacuum Refractive Index in a Stringy Space Time Foam Model", Physics Letters B, vol. 665, No. 5, pp. 412-418, Jul. 2008.
England, et al., "Dielectric Laser Accelerators", Reviews of Modern Physics, vol. 86, pp. 1337-1389, Oct.-Dec. 2014.
Gai, et al., "Experimental Demonstration of Wake-Field Effects in Dielectric Structures", Physical Review Letters, vol. 61, No. 24, pp. 2756-2758, Dec. 12, 1988.
Geddes, et al., "High-Quality Electron Beams from a Laser Wakefield Accelerator Using Plasma-Channel Guiding", Letters to Nature, vol. 431, pp. 538-541, Sep. 30, 2004, Nature Publishing Group.
Gessner, et al., "Demonstration of the Hollow Channel Plasma Wakefield Accelerator", Nature Communications, vol. 7, pp. 3202-3206, Jun. 2016.
Ginzburg, "Radiation from Uniformly Moving Sources (Vavilov-Cherenkov Effect, Transition Radiation, and Some Otehr Phenomena)", Acoustical Physics, vol. 51, No. 1, pp. 11-23, 2005, translated from Akusticheskil Zhurnal, vol. 51, No. 1, pp. 24-36, 2005.
Gonsalves, et al., "Petawatt Laser Guiding and Electron Beam Acceleration to 8 GeV in a Laser-Heated Capillary Discharge Waveguide", Physical Review Letters, vol. 122, pp. 084801-1-6, 2019.
Hakimi, "Wakefield in Solid State Plasma with the Ionic Lattice Force", Physics of Plasmas, vol. 25, pp. 023112-1-8, 2018.
Hofstadter, "The Atomic Accelerator", Stanford University HEPL Report No. 560, 1968.
Johnson, et al., "A Brief Review of Atomic Layer Deposition: from Fundamentals to Applications", Materials Today, vol. 17, No. 5, pp. 236-237, Jun. 2014.
Kazakov, et al., "High-Gradient Two-Beam Accelerator Structure", Physical Review Special Topics—Accelerators and Beams, vol. 13, pp. 071303-1-14, 2010, The American Physical Society.
Kimura, et al., "Hollow Plasma Channel for Positron Plasma Wakefield Acceleration", Physical Review Special Topics—Accelerators and Beams, vol. 14, pp. 041301-1-11, 2011, American Physical Society.
Lazarowich, et al., "Fabrication of Porous Alumina on Quartz Crystal Microbalances", Journal of Applied Physics, vol. 101, 104909-1-7, 2007, American Institute of Physics.
Lehman, et al., "Evaluating the Characteristics of Multiwall Carbon Nanotubes", Carbon, vol. 49, pp. 2581-2602, 2011, Elsevier.
LindstrØm, et al., "Measurement of Transverse Wakefields Induced by a Misaligned Positron Bunch in a Hollow Channel Plasma Accelerator", Physical Review Letters, vol. 120, 124802-1-5, 2018, American Physical Society.
Litos, et al., "High-Efficiency Acceleration of an Electron Beam in a Plasma Wakefield Accelerator", Nature, vol. 515, No. 7525, 8 pages, Nov. 6, 2014.
Mourou, et al., "Single Cycle Thin Film Compressor Opening the Door to Zeptosecond-Exawatt Physics", The European Physical Journal Special Topics, vol. 223, No. 6, pp. 1181-1188, May 2014.
Naumova, et al., "Relativistic Generation of Isolated Attosecond Pulses in a >3 Focal Volume", Physical Review Letters, vol. 92, No. 6, Feb. 13, 2004, pp. 063902-1-4, the American Physical Society.
Yi, et al. "Positron Acceleration in a Hollow Plasma Channel up to TeV Regime", Scientific Reports, vol. 4, No. 4171, 5 pages.
Pines, "A Collective Description of Electron Interactions: IV. Electron Interaction in Metals", Physical Review, vol. 92, No. 3, pp. 626-636, Nov. 1, 1953.

(56) References Cited

OTHER PUBLICATIONS

Purewal, et al., "Scaling of Resistance and Electron Mean Free Path of Single-Walled Carbon Nanotubes", Physical Review Letters, vol. 98, pp. 186808-1-4, 2007, The American Physical Society.
Ritchie, "Plasma Losses by Fast Electrons in Thin Films", Physical Review, vol. 106, No. 5, pp. 874-881, Jun. 1, 1957.
Sahai, "Nanomaterials Based Nanoplasmonic Accelerators and Light-Sources Driven by Particle-Beams", IEEE Access, vol. 9, pp. 54831-54839, 2021.
Sahai, et al., "Nanostructure Accelerators: Novel Concept and Path to its Realization", contribution to Snowmass 2021.
Sahai, "Non-Linear & Relativistic Effects in Plasma-Based Particle Acceleration", Duke, Ph.D. Dissertation, Ch. 8, 2016.
Sahai, et al., "Optimal Positron-Bean Excited Plasma Wakefields in Hollow and lon-Wake Channels", Proceeding of IPAC2015, Richmond, VA, Dec. 2015.
Schroeder, et al., "Multimode Analysis of the Hollow Plasma Channel Wakefield Accelerator", Physical Review Letters, vol. 82, No. 6, pp. 1177-1180, Feb. 8, 1999.
Shiltsev, "High-Energy Particle Colliders: Past 20 Years, Next 20 Years, and Beyond", Physics Uspekhi, vol. 55, No. 10, pp. 965-976, Oct. 2012.
Shiltsev, "Ultimate Colliders for Particles Physics: Limits and Possibilities", International Journal of Modern Physics, vol. 34, No. 34, 12 pages, 2019.
Stern, et al., "Surface Plasma Oscillations of a Degenerate Electron Gas", Physical Review, vol. 120. No. 1, pp. 130-136, Oct. 1, 1960.
Strickland, et al., "Compression of Amplified Chirped Optical Pulses", Optics Communications, vol. 56, No. 3, pp. 219-221, Dec. 1, 1985.
Tajima, et al., "Crystal X-Ray Accelerator", Physical Review Letters, vol. 59, No. 13, pp. 1440-1443, Sep. 28, 1987.
Tajima, et al., "Feeling the Texture of Vacuum: Laser Acceleration Toward PeV", Progress of Theoretical Physics, vol. 125, No. 3, pp. 617-631, Mar. 2011.
Tajima, "Laser Acceleration in Novel Media", The European Physical Journal, vol. 223, pp. 1037-1044, 2014, Springer-Verlag.
Tajima, et al., "Laser Electron Accelerator", Physical Review Letters, vol. 43, No. 4, pp. 267-270, Jul. 23, 1979.
Tajima, et al., "Surface Polaritons in LO-phonon-plasmon Coupled Systems in Semiconductors", Physical Review, vol. 18, No. 4, pp. 1892-1897, Aug. 15, 1978.
Tajima, et al., "Ultimate Acceleration in Crystals and Nanostructures", Contribution to Snowmass 2021.
Tomonaga, "Remarks on Bloch's Method of Sound Waves Applied to Many-Fermion Problems", Progress of Theoretical Physics, vol. 5, No. 4, pp. 544-569, Jul.-Aug. 1950.
Yakimenko, et al., "Prospect of Studying Nonperturbative QED with Beam-Beam Collisions", Physical review Letters, vol. 122, pp. 190404-1-7, 2019, American Physical Society.
Bandiera, et al., "Applications of Crystals and Nanotubes for Acceleration and Manipulation", Summary of ARIES Workshop, ACN2020, Mar. 10-11, 2020, Lausanne, CH,.
Di Mitri, et al., "Electron Beam Brightness in Linac Drivers for Free-Electron-Lasers", Physics Reports, Review Article, vol. 539, No. 1, 48 pages, May 2014.
Shin, "Beam-Driven Acceleration in Ultra-Dense Plasma Media", Applied Physics Letters, vol. 105, pp. 114106-1-5, Sep. 18, 2014.
Shiraishi, et al., "Work Function of Carbon Nanotubes", Carbon, vol. 39, No. 12, pp. 1913-1917, Oct. 2001, Elsevier.
Tajima, et al., "TeV on a Chip: A New Perspective of Wakefield Acceleration", CERN ATS Seminar, 46 pages, Feb. 13, 2020, Geneva, CH.
Yakimenko, "Ultimate Beams at FACET-II", Workship on Beam Acceleration in Crystals and Nanostructures, Jun. 25, 2019, 21pages, SLAC National Accelerator Laboratory.
"Ploymicro: Nano-Capillary Fused Silica Capilary Tubing", Molex, product information page, 2 pages, 2019, retrieved from www.molex.com/polymicro.
Office Action issued in Japanese Patent Application No. 2023-507359, issued on Aug. 19, 2025, 6 pages including 2 pages of English translation.
Sahai, et al., "Solid-State Tube Wakefield Accelerator Using Surface Waves in Crystals", WSPC Proceedings, vol. 23, No. 40, 29 pages, Aug. 21, 2019.

* cited by examiner

NANOSTRUCTURE NANOPLASMONIC ACCELERATOR, HIGH-ENERGY PHOTON SOURCE, AND RELATED METHODS

CROSS-REFERENCE TO RELATED APPLICATIONS

This patent application is a continuation of International Patent Application No. PCT/US2021/027919, entitled "Nanostructure Nanoplasmonic Accelerator, High-Energy Photon Source, and Related Methods," filed on Apr. 19, 2021, which claims the benefit under 35 U.S.C. § 119(e) of U.S. Provisional Patent Application Ser. No. 63/012,276, entitled "Nano Wakefield Accelerator and High-energy Photon Source Using a Nanostructured Tube," filed on Apr. 20, 2020, U.S. Provisional Patent Application Ser. No. 63/080,055, entitled "Ultra-solid Beams using Nanostructure Nanoplasmonic Wiggler and Accelerator driven by sub-micro charged particle-beam," filed on Sep. 18, 2020, and U.S. Provisional Patent Application Ser. No. 63/080,052, entitled "Sub-micron Charged Particle-beam Driven Nanostructure Nanoplasmonic Accelerator and Wiggler," filed on Sep. 18, 2020, each of which foregoing applications is incorporated by reference herein, in its entirety and for all purposes.

FIELD

The present disclosure relates to particle accelerators and related devices, systems and methods.

BACKGROUND

Acceleration of particles in nanomaterials provides the potential to achieve unprecedented TV $m^{-1}$ (TeraVolt per meter or TV/m) and PV $m^{-1}$ (PetaVolt per meter or PV/m) fields using plasmonic excitations. Recent theoretical research related to sub-micron charged particle bunches of quasi-solid energy density suggest the ability to generate TeV $m^{-1}$ or PeV $m^{-1}$ acceleration gradients using plasmonic modes in solids. Plasmonic modes have been theorized to sustain nanometric collective modes of conduction band electrons that yield TV $m^{-1}$ or PV $m^{-1}$ accelerating fields. These putative fields can be six orders of magnitude higher than those generated by traditional radio-frequency acceleration techniques or gaseous plasma wakefield acceleration techniques. However, to date there have been major challenges implementing such TV $m^{-1}$ and PV $m^{-1}$ plasmonic modes in solids. As such, there still remains a need to develop improved, compact particle accelerators and light sources.

SUMMARY

In one aspect, a device is provided for accelerating charged particles and producing high energy photons. The device may include a nanostructure comprising at least one tube having a hollow core channel surrounded by a wall of a nanomaterial comprising wall electrons and ions. These walls could be composed of any conductive material such as semiconductors, semi-metals, metals or materials engineered to tune the properties, as described herein. The nanostructure is configured to interact with a first beam of charged particles having a quasi-solid beam density up to or greater than $10^{17}$ $cm^{-3}$. The first beam of the charged particles gains energy or momentum at an average acceleration gradient greater than 1 Tera electron-Volt (TeV) per meter (TeV $m^{-1}$) along a longitudinal direction and undergoes focusing in the transverse direction to become a second beam of charged particles with the density of the beam of the charged particles increased by at least an order of magnitude.

In another aspect, a method is provided for producing high energy photons. The method may include directing a first beam of charged particles into a nanostructure comprising at least one tube having a hollow core channel surrounded by a wall of a conductive nanomaterial. The method may also include propagating the beam of charged particles through the nanostructure within the wall of the nanomaterial. The method may also include generating electromagnetic (EM) fields equal to or greater than 1 TV $m^{-1}$ in a plasmonic mode for self-focusing and nanomodulation (or "nano-modulation") of the beam of charged particles.

The method may also include forming a second beam of charged particles having a solid density of greater than $10^{22}$ $cm^{-3}$ by focusing and increasing the energy density along a longitudinal axis. The method may further include coherently producing photons having energy greater than 1 MeV by nanometric oscillations of the solid beam of charged particles resulting in a light source.

In a further aspect, a system is provided for producing high energy photons. The system may include a nanostructure comprising at least one tube having a hollow core channel surrounded by a wall of a nanomaterial, the wall of the nanomaterial comprising wall electrons and ions. The system may further include a mechanical stage for holding the nanostructure, the stage comprising motors configured to move in three orthogonal axes of X, Y, and Z, and along two directions of each axis of X, Y, and Z. The nanostructure is configured to interact with a first beam of charged particles having a quasi-solid beam density up to or greater than $10^{17}$ $cm^{-3}$. The beam of the charged particles gains energy or momentum at a rate greater than 1 TeV per meter along a longitudinal direction to gain energy and undergoes focusing in the transverse direction to become a second beam of charged particles having the density of the beam of the charged particles increased by at least an order of magnitude.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

Figure 1A:
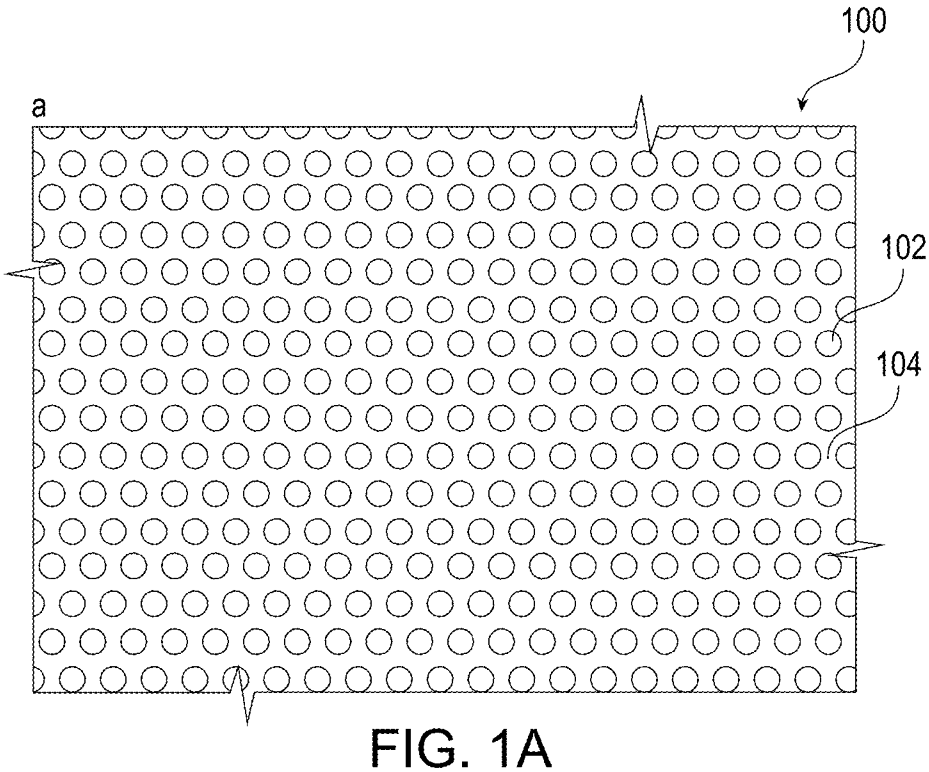
FIGS. 1A and 1C illustrate a top view and SEM image of a nanoporous alumina nanostructure with 100 nm core region, in accordance with embodiments of the disclosure.

The disclosure may be understood by reference to the following detailed description, taken in conjunction with the drawings as described below. It is noted that, for purposes of illustrative clarity, certain elements in various drawings may not be drawn to scale.

DETAILED DESCRIPTION

The disclosure provides devices, systems and methods for accelerating charged particles and producing high energy photons. In certain embodiments, the devices and systems comprise a nanostructure comprising at least one tube having a hollow core channel surrounded by a wall. In certain embodiments, the wall is comprised of a conductive material having wall electrons and wall ions. The nanostructure is configured to interact with a first beam of charged particle having a quasi-solid beam density greater than $10^{17}$ $cm^{-3}$. The first beam of the charged particles gains energy or momentum at an average acceleration gradient greater than 1 Tera electron-volt (TeV) per meter along a longitudinal direction and undergoes focusing in the transverse direction to thereby form a second beam of charged particles during use, the density of the second beam of particles being at least an order of magnitude greater than the first beam of the charged particles.

In certain embodiments, the nanostructure is a nano-plasmonic (nanoplasmonic) Wiggler and accelerator driven by sub-micron charged particle beams to generate ultra-solid beams of particles. In certain embodiments, the sub-micron charged particle beams may facilitate generation of tens of TV $m^{-1}$ electromagnetic fields using a nonlinear surface crunch-in mode driven by sub-micron charged particle beams in nanostructures, as discussed in further detail herein. In accordance with aspects of the disclosure, the nanostructures of the disclosure in combination with solid energy density attosecond ($10^{-18}$ s) charged particle beam bunch compression allows for such a crunch-in mode.

Without intending to be limited by theory, in accordance with aspects of the disclosure, three dimensional computational and analytical modeling, as described herein, demonstrates GeV energy gain utilizing a nanostructure comprising hundreds of sub-millimeter long nanostructure tubes with apparent conduction band electron densities in the nanostructure tube walls (effective wall electron density), $n_t$, of about $10^{22}$-$10^{21}$ $cm^{-3}$, and driven by interaction with beams of charged particles having an peak electron density, $n_b$, approaching near-solid densities, e.g., about 0.05 $n_t$. In certain embodiments, the nanostructures of the disclosure provide for TeV $m^{-1}$ average particle acceleration gradients, as well as tens of TV $m^{-1}$ crunch-in transverse electromagnetic fields. The acceleration gradients and electromagnetic fields lead to self-focusing and nanomodulation of the beam of charged particles, both of which drive beam compression from near-solid to ultra-solid peak beam density, and as a result also increase the crunch-in mode field strength. This self-reinforcing nano-wiggler mechanism allows for controlled and coherent O(100 MeV) photon production (that is, photons with energy of order $10^6$ eV).

In accordance with aspects of the disclosure, relativistic charged particle beams may be utilized to strongly excite nanoplasmonic modes in nanostructures with characteristics well suited for the generation of ultra-solid particle beams using nanostructure nanoplasmonic wigglers and accelerators. Without intending to be limited by theory, the ability of these modes to generate $10^{12}$ V/cm (TV/cm) electromagnetic fields and TeV $m^{-1}$ average particle acceleration gradients greatly facilitates coherent background-less high-energy gamma-ray photon production and particle acceleration. By way of example, as the beams approach near-solid densities, e.g., $n_b$ of about $10^{20}$ $cm^{-3}$, relying on sub-micron bunch compression (towards tens of nm bunch lengths with nC charge) that offer tens of kilo-ampere ($10^3$ A, or kA) to tens of mega-ampere ($10^6$ A, or MA) peak currents. Excitation of the desired nanoplasmonic modes can produce observable signatures on the charged particle beams, which include TV/cm electromagnetic field driven, structured nano-slicing, self-focusing, nanomodulation, controlled high-energy photon production as well as TeV/cm acceleration of the beam.

In certain aspects, the flexibility in design of nanostructures of the disclosure (composition, geometry etc.) provides vacuum-like hollow core regions surrounded by walls comprised of nanomaterial. In some embodiments, the nanomaterials provide nanometrically thin and nanoporous (or "nano-porous") walls. Using such nanostructures and nanomaterials, charged particle beam dynamics may be dictated by the electromagnetic fields of collective surface plasmonic modes, including the electromagnetic fields of the surface crunch-in mode in the core region (without collisions or channeling).

Without intending to be limited by theory, in certain embodiments, under the action of many tens of TV/m transverse electromagnetic fields, charged particle bunches undergo self-focusing and nanomodulation. These processes can allow the charged particle beam to self-focus into ultra-solid nano-slices. Collective radiation from the beam self-focusing into ultra-solid nano-sliced beam that propagate inside the hollow core region and undergo nanometric transverse oscillations, has significantly more spatio-temporal coherence compared with collision-dominated bremsstrahlung or channeling radiation. This controlled radiation production thus enables O(100 MeV) photon emission with a nanometric source-size. With compression of beam waist from a few microns to sub-micron dimensions that approach the size of vacuum-like core regions of the tubes, these beams are wholly contained inside the tube which makes possible the demonstration of a gamma-ray nano-wiggler or O(100 MeV) photons. Moreover, the nano-wiggler instability under transverse fields of the crunch-in mode compress the beam from near-solid to ultra-solid densities which can be further used for brighter radiation production, which can be obtained from the TeV/m accelerator.

Suitable light sources with O(100 MeV) photon energies are currently unavailable. The devices, systems and methods of the disclosure thus enables a wide range of unprecedented applications, including in, e.g., semiconductor fabrication, medical applications, and photon-driven Quantum Chromodynamics (QCD). In yet other aspects, the disclosure provides a nanostructure nanoplasmonic accelerator with tens of TeV/m (TeV per meter, or TeV $m^{-1}$) acceleration gradient with sub-micron near-solid to meta-solid density beams. Such devices may have GeV-scale energy gain in millimeter scale nanostructures. Tens of TeV/m gradients are unmatchable by plasma accelerators. The devices, systems and methods of the disclosure thus enables new pathways in collider physics and non-collider paradigms, e.g., nonlinear Quantum Electrodynamics (QED), etc.

Figure 1B:
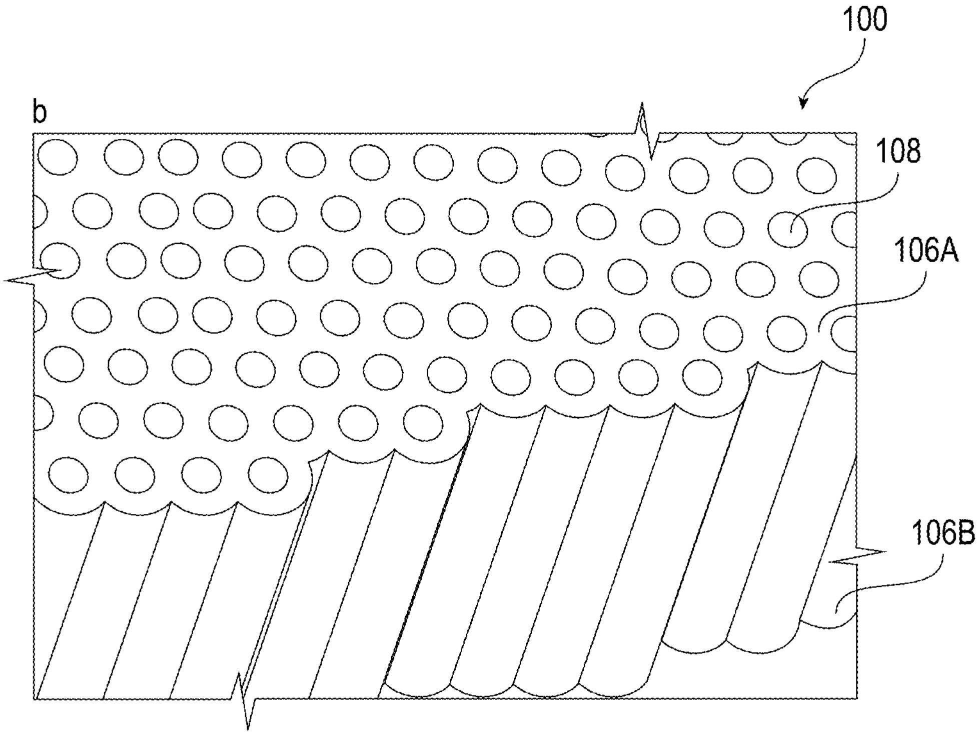
FIGS. 1B and 1D illustrate a perspective view and SEM image of the nanoporous alumina nanostructure with 100 nm core region in FIGS. 1A and 1C, in accordance with embodiments of the disclosure.
Figure 1C:
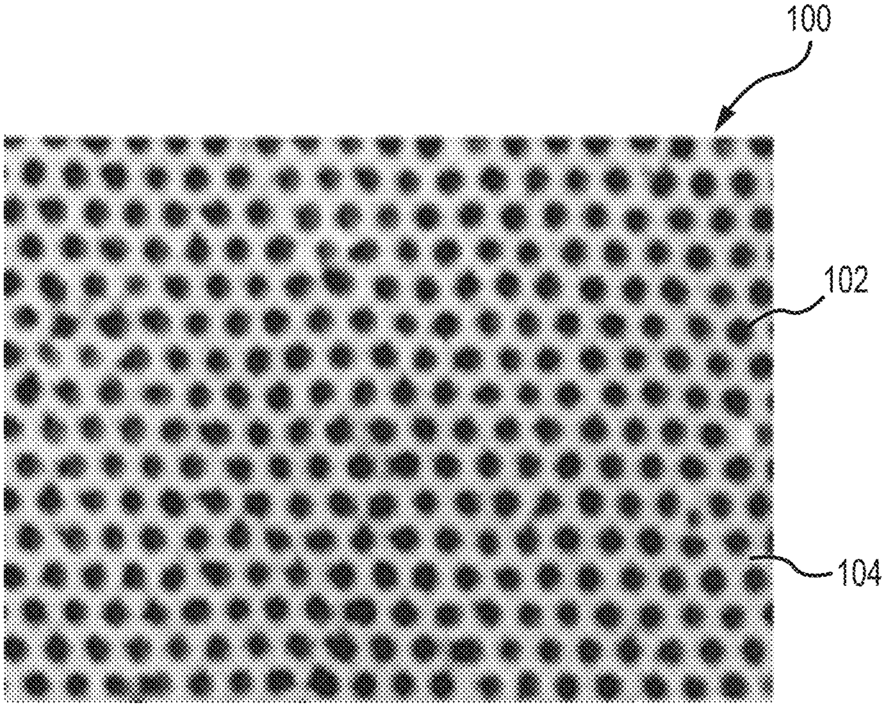
Figure 1D:
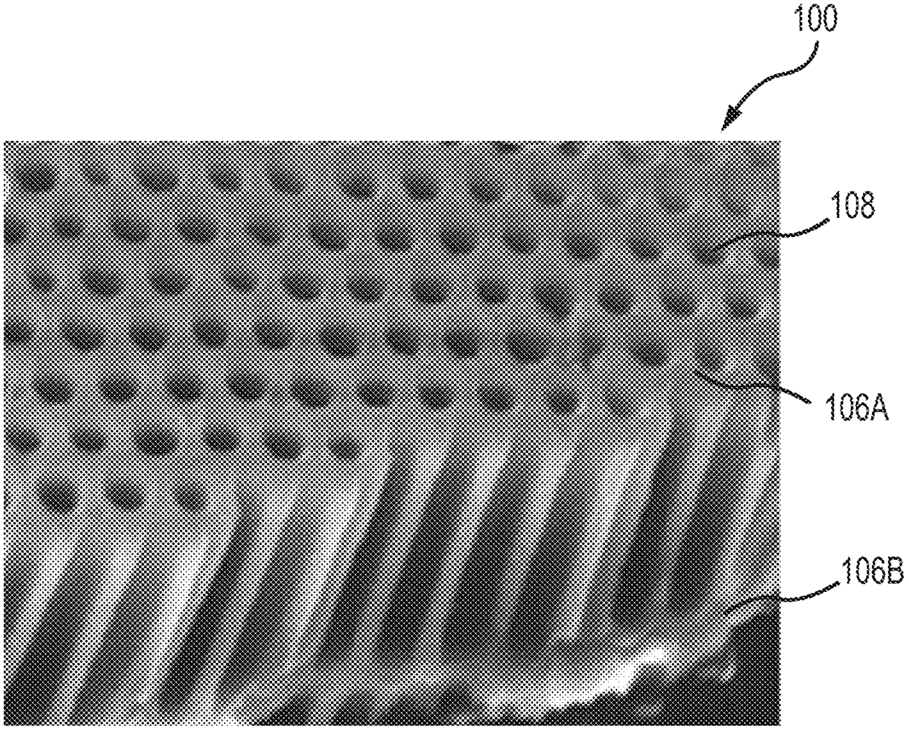

Now, with reference to the figures, FIGS. 1A and 1C illustrate a top view and SEM image of nanoporous alumina nanostructure 100 with 100 nm core region, in accordance with embodiments of the disclosure. FIGS. 1B and 1D illustrate a perspective view and SEM image of the nanoporous alumina nanostructure 100 with 100 nm core region in FIGS. 1A and 1C, in accordance with embodiments of the disclosure. As shown, a nanoporous material or a nanostructure 100 may include arrays of tubes 108 including vacuum-like core regions 102 having an internal core radius $r_t$, the core regions surrounded by thin walls 104 having a thickness Δw. As shown, the nanostructure 100 includes a first end 106A and a second 106B opposite to the first end. Without being limited, such configurations allow almost all of the charged particle beam to propagate in the vacuum-like core regions of the nanostructure.

It will be appreciated by those skilled in the art that the material for the tubes of the nanostructure 100 may vary. In some embodiments, the tubes of the nanostructure may be formed of a nanomaterial. In some embodiments, the wall 104 of the tube 108 may include a nanoporous metal. In some embodiments, the wall 104 of the tube 108 is solid.

Figure 2A:
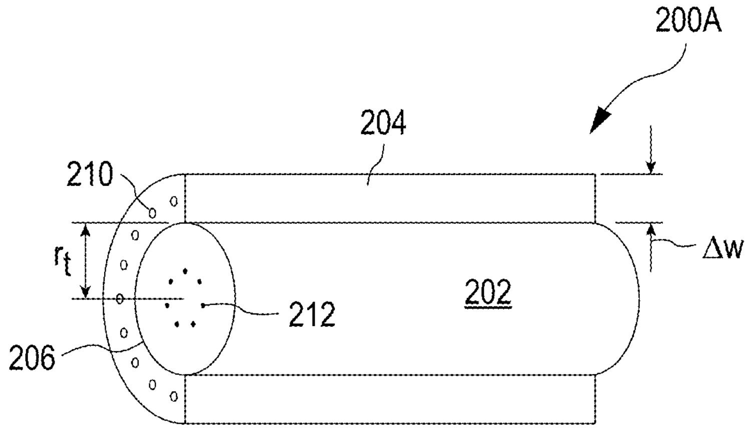
FIG. 2A illustrates a perspective view of a tube in accordance with embodiments of the disclosure.

FIG. 2A illustrates a perspective view of a tube 200A, in accordance with embodiments of the disclosure. As shown in FIG. 2A, a single tube 200A includes a cylindrical wall 204 having an inner surface 206 having an interior tube radius $r_t$. The wall 204 has a wall thickness Δw, as labeled. The wall 204 includes tube electrons or wall electrons 210 that are also referred to free electrons or Fermi gas in the disclosure. As shown, the charged particles 212 are inside a hollow portion or core 202 of the tube 200A.

Figure 2B:
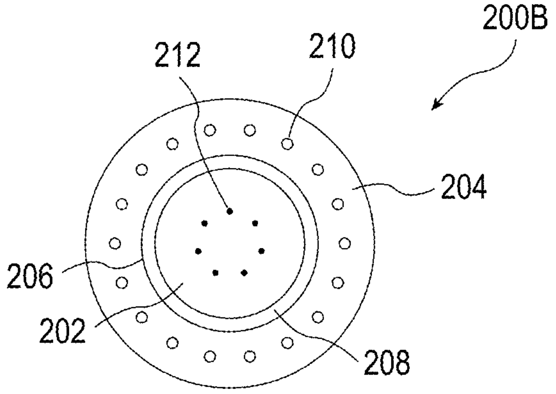
FIG. 2B illustrates a cross-section view of the tube of FIG. 2A in accordance with embodiments of the disclosure.

FIG. 2B illustrates a cross-section view of a tube 200B with an inner coating 208, in accordance with embodiments of the disclosure. As shown in FIG. 2B, a coated tube 200B includes a coating 208 applied to the inner surface 206 of the tube 200A. The coating 208 can be formed of a nanomaterial.

In some embodiments, the nanostructure may include a coating material on the walls of the at least one tube. The coating material may be a nanomaterial, such as nanoporous metals among others. In some embodiments, the nanostructure and the nanomaterial wall may have tunable properties comprising structure, dimension, density, and composition. In some embodiments, the nanomaterial may have a conduction band electron density affecting the surface plasmonic mode that sustains EM fields greater than TV $m^{-1}$. In some embodiments, the at least one tube has a length ranging from 0.1 micron ($10^{-4}$ mm) to $10^6$ micron (1 μm).

Figure 2C:
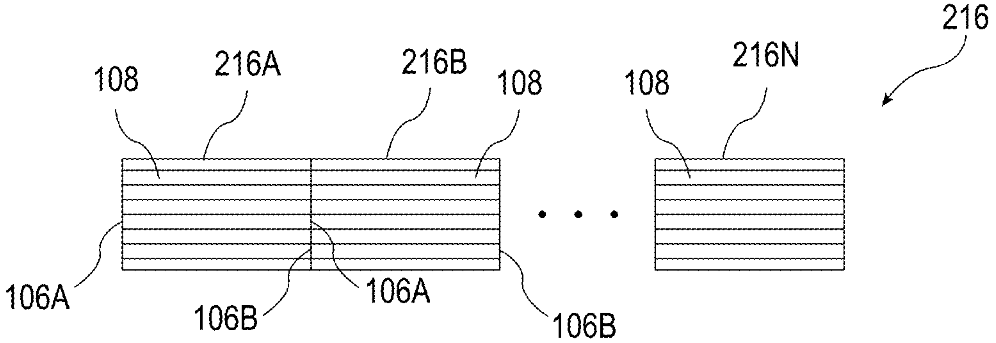
FIG. 2C illustrates a simplified sketch of a nanostructure including a plurality of arrays joined together in accordance with embodiments of the disclosure.

FIG. 2C illustrates a simplified illustration of a nanostructure 216 including a plurality of arrays 216A, 216B . . . 216N joined together, in accordance with embodiments of the disclosure. In certain embodiments, the nanostructure comprises at least a first tube array 216A and a second tube array 216B, where the first tube array 216A and the second tube array 216B are provided in a stacked orientation so as to extend the effective length of the tubes 108 of the nanostructure.

As shown in FIG. 2C, a nanostructure 216 may include a number of arrays 216A, 216B . . . 216N (e.g., nanostructure arrays 100 as shown in FIGS. 1A and 1C and FIGS. 1B and 1D), joined together in a stacked orientation. For example, a first array 216A has tubes 108 with two opposite ends, 106A and 106B. A second array 216B also has tubes 108 with two opposite ends, 106A and 106B. A first end 106A of the tubes 108 in the second array 216B can be joined to the second end 106B of the tubes 108 in the first array 216A, so as to form a stacked orientation. The nanostructure 216 may include two or more of arrays 216A, 216B . . . 216N of tubes 108 to extend the effective length of the arrays of tubes 108. In some embodiments, the nanostructure 216 may include at least a third tube array 216N, where the first tube array 216A, the second tube array 216B, and the third tube array 216N are provided in a stacked orientation so as to extend the effective length of the tubes 108 of the nanostructure 216.

In certain embodiments, the devices, systems and methods of the disclosure utilize a flat-top beam limit where the beam is much wider than the radius of a single tube, thus the same underlying physics of crunch-in regime occurs in multiple tubes.

For mechanical stability, a bundle of hundreds to thousands of tubes (i.e., 100 to 2000, 100 to 1500, 500 to 1000, etc.) can be used, where each tube has an overall width, e.g., of about one micron, resulting in a centimeter-scale wide macroscopic sample. Apart from the mechanical stability, such a macroscopic sample containing thousands of tubes in the bundle may allow translation to enable the micron-scale beam spot to be able to interact with a different fresh region of the sample, especially if there is damage or malfunction of a tube.

In certain aspects, the disclosure provides a solid-state nonlinear surface or "crunch-in" mode to facilitate implementation of a nano-wakefield accelerator. Such a crunch-in mode utilizes the convergence of attosecond compression techniques and solid density particle bunches to achieve its acceleration fields. These advances allow an intense bunch propagating in a tube with vacuum-like core of hundreds of nanometer radius, $r_t$ and effective wall densities, $$n_t \sim 10^{22-24}\ \mathrm{cm}^{-3},$$

to drive the tube electrons to crunch into its core. The strong electrostatic component of this surface wave helps sustain TV $m^{-1}$ accelerating fields without direct interaction with ions. Without intending to be limited by theory, a crunch-in mode of the disclosure may be elucidated using 3D computational and analytical models.

In certain aspects, excitation of the surface crunch-in mode as wakefields in nanostructured tubes is more practical compared to bulk modes in unstructured solids, e.g., because nanofabrication allows better control over structure, density, thickness, among others. This further mitigates the adverse effects of direct irradiation of bulk solids. Investigations of fiber-like tubes using a scanning electron microscope reveal a vacuum-like core with a few nanometers wall-to-core transition. In accordance with aspects of the disclosure, deposition of porous material on the inner tube surface allows tunable effective density as well as other characteristics. Nanofabricated tubes of the disclosure thus allow in-vacuum propagation of the most populated part of the particle bunch, which overcomes obstacles such as collisions, emittance degradation, filamentation, etc.

In accordance with aspects of the disclosure, it was found that hundreds of nm long bunches are short enough for controlled excitation of the surface crunch-in mode. In certain embodiments it was found that use of a near solid density beam, $n_b$~0.01 $n_t$, facilitates the ability of the crunch-in mode to approach the coherence (wavebreaking) limit of collective fields, $$E_{wb} \sim 9.6\left(n_t\left[10^{22}\ \mathrm{cm}^{-3}\right]\right)^{1/2}\ TV\ \mathrm{m}^{-1}.$$

Such beams can drive wavebreaking wakefields (~$E_{wb}$) using a self-focusing effect described herein.

Electric fields of solid density charged particle beams approach TV $m^{-1}$. The hundreds of eV potential of solid beams over atomic scales (~10 angstrom, or 10 Å) is thus significantly higher than the few eV electron binding energy in nanostructured materials. Moreover, the unbound electrons or free electrons or wall electrons acquire relativistic momenta over atomic scales in the presence of TV $m^{-1}$ beam fields.

Solid-state modes based on oscillations of conduction band electron gas (plasmon) have oscillatory velocities just higher than the Fermi velocity, VF. Contrasted to this, in aspects of the disclosure it was found that the collisionless nature of conduction band electron oscillations in bulk solid or on its surface may be enhanced in nanostructures which manifest micron level mean free paths. Due to these distinctive characteristics, attosecond collective electron dynamics in relativistic excitation of nanostructures approximates that of a collisionless quasi-neutral electron gas in background ionic lattice.

The nonlinear surface crunch-in mode modeled here thus exhibits several unique features. Firstly, it is a relativistic nonlinear generalization of the surface plasmon polariton (SPP) mode. Secondly, while the SPP mode is sustained by small-scale surface electron oscillations, here the high oscillation amplitude leads to the crunch in of tube wall electrons deep into its core. Lastly, quintessential solid-state properties, such as energy quantization and periodic ion lattice potential, become less relevant.

In certain embodiments, a quasi-neutral electron gas of density no, the effective excitation of wakefields may be facilitated by particle bunch compression of the order of $$\omega_{pe}^{-1} = \left[4\pi n_0 e^2 m_e^{-1}\right]^{-1/2} = 177\left(n_0\left[10^{22}\ \mathrm{cm}^{-3}\right]\right)^{-1/2}\ \text{attosecond and}$$

$$\lambda_{pe} = 2\pi c\omega_{pe}^{-1} = 333\ \left(n_0\left[10^{22}\ \mathrm{cm}^{-3}\right]\right)^{-1/2}\ \mathrm{nm}.$$

Access to wavebreaking fields, $E_{wb}[n_0]=m_e c\ \omega_{pe}^{-1}$ is also facilitated by sufficient energy density which further necessitates a minimum number of particles in the ultrashort bunch.

In certain aspects of the disclosure, tunable nanofabrication offers advantages in atomic scale structural design. A nanofabricated near hollow tube with tunable properties, e.g., hundreds of nanometer internal tube radius $r_t$ and effective wall density $n_t$, may be used to sustain wakefields where a significant fraction of the oscillating tube wall electrons crunches into the core. These crunch-in nonlinear surface wave wakefields make possible the excitation of wall density wavebreaking fields ($E_{wb}[n_t]$).

In other aspects, the disclosure provides methods for self-focusing of a particle beam to a ultra-solid nano-sliced beam. The method includes self-focusing into ultra-solid nano-slices, nanomodulation, and accompanying high-energy radiation generation. The beam waist size $\sigma_{x,y}$ may be larger than the design tube radius $r_t$, i.e. $\sigma_{x,y}>r_t$ and the charged particle beam density $n_b$ is less than nanostructure effective wall electron density $n_t$, i.e. $n_b<n_t$.

In accordance with certain embodiments, the hundreds of GV/m to many TV/m self-fields of the charged particle bunch with densities that approach and exceed $10^{20}$ $cm^{-3}$ can strongly excite the Fermi electron gas, which may occur when the bunch length is resonant with the plasmonic wavelength.

Under strong excitation, the Fermi electron gas can experience tens to hundreds of eV potential over atomic scale (approximately 10-100 Å) and is free to move across the solid surface. Not only is the Fermi electron gas unbounded, but under the action of the beam self-focusing fields, the Fermi electron gas or tube wall electrons can gain relativistic momentum. This relativistic collective motion of the strongly driven Fermi electron gas excites relativistic nanoplasmonic modes. Beam dynamics is thus dictated by the fields sustained by collective surface plasmonic modes, such as the fields of nonlinear surface crunch-in mode that are exerted within the core region in addition to the fields in the surrounding wall region.

In accordance with aspects of the disclosure, nanofabrication provides access to nanostructures where the beam can be guided within a vacuum-like core while experiencing the surface fields of the enclosing nanostructure. Nanofabrication also offers nanostructures having tunable characteristics, such as porous materials of tunable effective density, surface structure etc.

Because nanofabrication offers the proven ability to precisely design the properties of nano-geometries including the nanoscale (or "nano-scale") structure and composition among others, it is possible to substantially control the properties of nanostructure nanoplasmonic modes.

Whereas the parts of the charged particle beam interacting with the thin wall, the tube wall electrons, tube electrons, or wall electrons can get afflicted by collisions and disruptive filamentation effects etc., collective beam dynamics in the vacuum-like core region is unaffected by these highly detrimental processes. Moreover, as the strength of the surface plasmonic crunch-in mode increases, the charged particle beam undergoes significant modulation under the action of the mode to further reinforce the strength of the nanoplasmonic mode fields. Therefore, the use of the nanostructure nanoplasmonic modes, which eliminate interaction of the charged particle beam with the ionic lattice, is substantially beneficial compared to the use of bulk solid plasmonic modes for crystal acceleration using particle beams and x-ray pulses.

In other aspects, the disclosure provides devices, systems and methods including a Gamma-ray nano-wiggler with an ultra-solid beam. In some embodiments, the disclosure provides devices, systems and methods including an efficient and bright ultra-solid beam gamma-ray source by, e.g., reducing the bremsstrahlung and channeling radiation background under the beam and target properties: $\sigma_{x,y}$~$r_t$ as well as $n_b$~<$n_t$>.

In other aspects, the disclosure provides devices, systems and methods for self-focusing a charged particle beam into ultra-solid nano-slices using the transverse focusing fields of the crunch-in mode. In some embodiments, the methods of the disclosure may include sub-micron solitary nano-slice beam self-focusing, nanomodulation and TeV/m (TeV $m^{-1}$) particle acceleration using the crunch-in mode fields. In certain embodiments, the devices, systems and methods may include sub-micron solitary ultra-solid nano-sliced production using controlled nano-wiggler mechanism towards self-focusing instability, and also self-focusing based ultra-solid beam production. In some embodiments, the beam waist size is near the design tube core radius $\sigma_{x,y}$~$r_t$ and $n_b$~<$n_t$>.

In certain aspects, the peak on-axis beam density $n_{b0}$ rises by an order of magnitude or more to result in unprecedented ultra-solid beam. The rise in peak beam density increases the crunch-in mode amplitude and the crunch-in focusing field which results in the nano-wiggler instability. Importantly, the tube focusing fields thus not only guide the beam due to a net focusing force but also suppress the beam breakup (BBU) instability which occurs due to lack of focusing forces in conventional tube modes. In conventional tube modes such as hollow channel plasma wakefields the unfavorable transverse fields not only lead to BBU but also adversely deflect under small misalignments.

In other aspects, without being limited by theory, the crunch-in mode has a significant electrostatic component and is not just electromagnetic. Instead, the disclosed EM fields include both electrostatic fields and electromagnetic fields with a net transverse EM field in a radial direction perpendicular to the longitudinal direction. Purely electromagnetic linear surface modes such as those regularly excited in RF cavities, hollow-channel plasma wakefield regime, dielectric wakefield regime, dielectric laser accelerators etc. have been proven to be limited in gradient while also exhibiting non-optimal transverse characteristics such as deflection of misaligned beams, higher-order wakefields driven beam breakup (BBU) etc. While the nonlinear surface crunch-in mode of the disclosure offers the ability to sustain fields around the coherence limit of collective oscillations, it can also guide the beam and offers several other controllable features. The nanostructures of the disclosure, thus, not only help overcome the adverse effects of direct beam lattice interactions which disrupt the acceleration process in bulk crystals but also help overcome the well-established limitations and constraints of purely electromagnetic surface modes.

In yet other aspects, the disclosure provides a system for producing high energy light source. The system may include a nanostructure comprising at least one tube having a hollow core channel surrounded by a wall of a nanomaterial, the wall of the nanomaterial comprising wall electrons and ions. The nanostructure and the nanomaterial wall may have an effective wall electron density $n_t$ ranging from $10^{20-24}$ $cm^{-3}$. The nanostructure may be configured to interact with a first beam of charged particles having a quasi-solid beam density greater than $10^{18}$ $cm^{-3}$ to the nanostructure. In certain embodiments, the beam of the charged particles may be focused by the focusing fields of the plasmonic mode to have a solid density of greater than $10^{22}$ $cm^{-3}$.

In certain embodiments, the system may also include a mechanical stage for holding the nanostructure. The stage may include motors configured to move in three orthogonal axes of X, Y, and Z, and along two directions of each axis of X, Y, and Z, where the first beam of the charged particles gains energy or momentum at a rate greater than TeV per meter along a longitudinal direction to gain energy and undergoes focusing in the transverse direction to become a second beam of charged particles having the density of the beam of the charged particles increased by at least an order of magnitude. In other embodiments, the system may also include a monitoring module configured to provide analysis of properties of electrons, positrons, protons and photons.

In some embodiments, the system may also include gaseous plasma ion column or plasma lens for compressing the charged particle beam waist size to hundreds of nanometers. In some embodiments, the system is configured to interact with charged particles that have a bunch length and a bunch waist-size dimension of 10 μm or less. In some embodiments, the system is configured to interact with charged particles that have submicron length and waist-size dimensions. In some embodiments, the system is configured to interact with the charged particles that have a solid density of greater than $10^{22}$ $cm^{-3}$ after acceleration.

In some embodiments, the system is configured to interact with charged particles having a waist size of the beam of the charged particles ranging from 0.1 to 100 times that of the internal tube radius, $r_t$. In some embodiments, the system is configured to interact with charged particles having a bunch length of the beam of charged particles ranging from 10 nm ($10^{-8}$ m) to 30.0 μm ($3\times10^{-5}$ m).

In some embodiments, the system is configured to interact with charged particles having a beam waist size greater than an internal tube radius $r_t$, with at least 50 percent (half) portion of the beam of charged particles extending beyond the wall of a single tube. In other embodiments, the system is configured to interact with charged particles having a beam waist size less than an internal tube radius $r_t$, with less than 50 percent (half) portion of the beam of charged particles extending beyond the wall of a single tube.

In some embodiments, the system is configured to interact with charged particles having a quasi-solid beam density $n_b$ of the beam of the charged particles less than the effective wall electron density, from $10^{-4}$ $n_t$ to $10^{2}$ $n_t$. In some embodiments, the nanostructure of the system has an effective wall electron density $n_t$ ranging from $10^{20-24}$ $cm^{-3}$, where the effective wall density accounts for the porous nature of the wall nanomaterials.

In some embodiments, the system is configured such that the beam of charged particles interacts with the wall of a tube to thereby force the wall electrons to move while the ions in the wall of the nanomaterial remain stationary to generate electromagnetic (EM) fields. In other embodiments, the system is configured such that the beam of charged particles propagates in the hollow core channel of a tube to thereby collectively drive the wall electrons, such that the wall electrons move away together from their equilibrium position in the wall, and crunch into the hollow core of the at least one tube to be in a plasmonic mode.

In some embodiments, the system is configured such that the collective oscillatory motion of the wall electrons of a tube (or tubes) excites the plasmonic mode. In certain embodiments, the amplitude of the plasmonic mode increases as the beam bunch characteristics (e.g., length, waist size, number of particles of the beam of the charged particles, etc.) approaches resonance with the plasmonic mode.

In some embodiments, the system is configured such that the beam of charged particles undergoes transverse nanometric oscillations and experiences a transverse focusing field in excess of TV $m^{-1}$, thereby resulting in nanomodulation of the beam of the charged particles with spatial frequencies corresponding to $\lambda_{osc}$~O(100 nm) to reinforce the strength of EM fields of the surface plasmonic mode.

In some embodiments, the system is configured to produce radiation by the transverse nanometric oscillations of the beam of the charged particles in the transverse focusing fields in excess of TV $m^{-1}$ and to provide a light source with photons having energies greater than 1 MeV. In some embodiments, the photons have energies greater than 10 MeV.

In some embodiments, the system is configured to produce an average acceleration gradient of the beam of the charged particles of at least 1 TeV $m^{-1}$. In some embodiments, the average acceleration gradient is at least 2 TeV $m^{-1}$ for the beam of the charged particles. In some embodiments, the average acceleration gradient is at least 5 TeV $m^{-1}$ for the beam of the charged particles. In some embodiments, the average acceleration gradient is at least 10 TeV $m^{-1}$ for the beam of the charged particles.

In some embodiments, the system is configured to produce at least a 1 GeV energy gain in millimeter long nanostructure tube for the beam of the charged particles. In some embodiments, the system has at least 2 GeV energy gain in millimeter long nanostructure tube for the beam of the charged particles. In some embodiments, the system is configured to produce at least a 5 GeV energy gain in millimeter long nanostructure tube for the beam of the charged particles. In some embodiments, the system is configured to produce at least a 10 GeV energy gain in millimeter long nanostructure tube for the beam of the charged particles.

Figure 6:
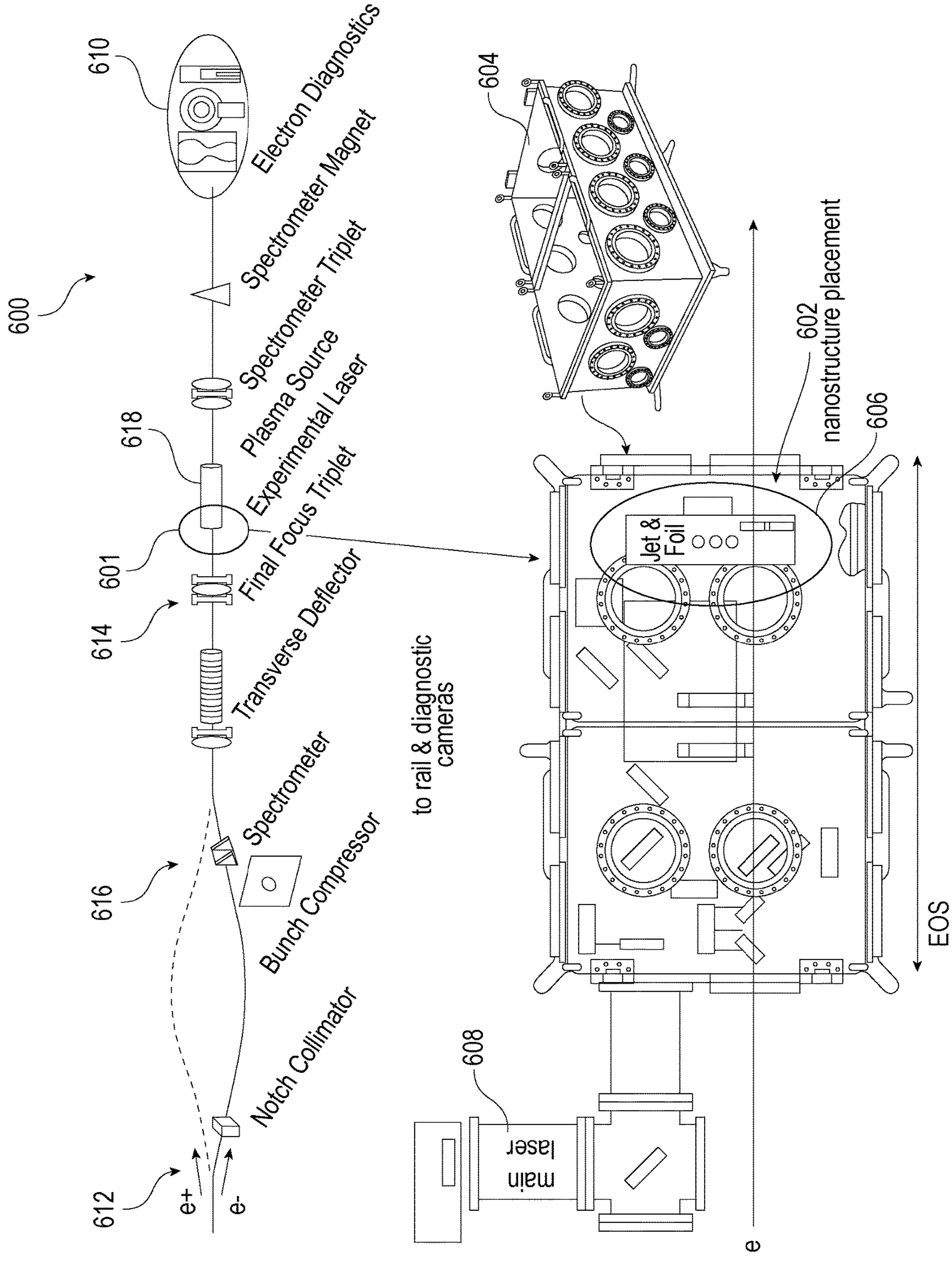
FIG. 6 illustrates a system including beamline locations and layout of nanostructure sample setup in a vacuum chamber in accordance with embodiments of the disclosure.

FIG. 6 illustrates an exemplary system 600 in accordance with embodiments of the disclosure, the system including beamline locations and layout of a nanostructure of the disclosure, setup in a vacuum chamber. System 600 may include a nanostructure subsystem 601 located in combination with a plasma source 618, e.g., the FACET-II Facility for Advanced Accelerator and Experimental Tests at the Stanford Linear Accelerator Collider (SLAC), in Menlo Park, California.

The system 600 may include a source that provides a beam of charged particles 612. The system 600 may also include a beam focusing mechanism 616, including, e.g., final focusing magnets 614. The focusing mechanism 616 may be configured to focus the beam of charged particles before the beam of the charged particles interacts with the nanostructure subsystem 601. The focusing mechanism 616 may be configured to compress the waist size of the beam to less than a micron. For example, the focusing mechanism may comprise one of one or more plasma lens or magnets. In some embodiments, the beam waist size may be compressed to 100 nm or less.

The nanostructure subsystem 601 may include the placement and alignment of nanostructure 606 in a vacuum chamber 604 having a metallic sealed box with windows. The vacuum chamber 604 may be used for the redirection of the laser into the path of the particle beam 612. The nanostructure subsystem 601 may also include a mechanical stage 602 for holding the nanostructure 606, the stage 602 comprising motors configured to move in three orthogonal axes of X, Y, and Z, and along two directions of each axis of X, Y, and Z. In certain embodiments, the stage 602 may have six (6) axes of motorization (for example, a Thorlabs "apt 600 series" stage 602, available from Thorlabs, Inc., of Newton, New Jersey) and allows for precision positioning and alignment as well as raster scans. The nanostructure 606 may be set up in the beamline, where the nanostructure 606 can be aligned using the mechanical stage 602.

In certain embodiments, when the nanostructure subsystem 601 is located closer to the final focusing magnets 614, the beam waist may be closest to the nanostructure 606, which helps in coupling the highest density beam, $n_b$ onto the nanostructure 606.

The subsystem 601 also includes a laser 608 in the vacuum chamber 604. The laser 608 can be used to assist in precise alignment of the nanostructure sample 606 with the charged particle beam 612. In some embodiments, the charged particles may include one or more of the particles of electrons, positrons, or protons.

As the nanostructure 606 can be raster scanned to accomplish systematic parameter scans, the data collection can be performed using the DAQ (data acquisition) system to automate data acquisition while the nanostructure 606 is raster scanned. The motors of the multi-axis stage 602 for mounting the nanostructure 606 may be controlled by a suitable controller; e.g., an XPS controller (or equivalent) available from Newport Corporation of Irvine, California, or within a suitable control system environment; e.g., in an EPICS system (Experimental Physics and Industrial Control System) environment.

The system 600 may include a monitoring module 610 configured to provide analysis of properties of electrons, positrons, protons and photons. By way of non-limiting example, the monitoring module may detect and analyze sub-micron transverse dimensions of the beam waist. In certain embodiments, monitoring module may include one or more sensors, imagining systems, or other particle properties monitoring feature. The monitoring module may include at least one processor configured to analyze particle properties and provide indications of particle properties.

By way of example, for the detection and analysis of positron-electron production from the decay of high-energy gamma-rays from the nano-wiggler, a ~100 MeV spectrometer comprising of a D-shaped dipole magnet followed by a scintillator which is imaged by a scientific camera, can be used. The camera can be located about 20 cm to 50 cm from the target in order to capture the electron-positron pairs from decay of high-energy gamma-ray photon.

In other embodiments, the detection and analysis of nano-wiggler produced gamma ray energy, yield and angular distribution can be characterized using a detector including metallic converter foil targets of an array of thicknesses which produce photons that can illuminate a scintillator that is imaged using Scientific Complementary Metal Oxide Semiconductor (sCMOS) camera. Using an array of different types of metals of varying thicknesses, the measurement of transmission and conversion to secondary particles behind each foil can provide a measure of the energy spectra of the nano-wiggler driven gamma rays.

To produce energies of photons, the system may inject a first beam of charged particles 612 into a nanostructure 606 comprising at least one tube having a hollow core channel surrounded by a wall of a nanomaterial. The beam of charged particles propagate through the nanostructure 606 within the wall of the nanomaterial. The method may also include generating electromagnetic (EM) fields equal to or greater than 1 TV $m^{-1}$ in a plasmonic mode for self-focusing and nanomodulation of the beam of charged particles.

The energy density is increased along a longitudinal axis to form a second (focused) beam of charged particles having a solid density of greater than $10^{22}$ $cm^{-3}$. The system coherently produces photons having energy greater than 1 MeV by nanometric oscillations of the solid beam of charged particles to generate a light source. The nanomaterial has an effective wall electron density $n_t$ ranging from $10^{21-24}$ $cm^{-3}$. The system may comprise the beam 612 to reduce the beam waist size to 100 nm or less prior to the step of injecting a beam of charged particles into the nanostructure 606, where the beam waist size is reduced to 10 nm or less.

EXAMPLES

The Examples below provide details of simulations, models, and experiments that demonstrate the devices, systems and methods of the disclosure. Examples may be performed using equipment including emittance spoiling system, gamma-ray detectors, positron-electron pair spectrometer, vacuum, cooling water, gasses, electricity, magnets, detectors, among others. The examples may include nano-slicing, self-focusing, nanomodulation in nanostructures, nano-wiggler and ultra-solid self-focusing, nano-accelerator, and ultra-solid self-focusing. As referenced herein, FACET is a multi-GeV Facility for Advanced Accelerator and Experimental Tests at the Stanford Linear Accelerator Collider (SLAC), including FACET-II, which is a test facility providing unique capability to develop advanced acceleration and coherent radiation techniques with high-energy electron and positron beams.

In certain embodiments, the examples may provide structured beam nano-slicing with ultra-solid self-focused slices in nanostructures under $\sigma_{x,y}>>r_t$ and $n_b<<n_t>$. The examples may also characterize nano-slicing and self-focusing of the beam as a function of beam and nanostructure parameters. In certain embodiments, the examples may also repeat the above characterization with $\sigma_{x,y}\sim r_t$ and $n_b\sim<n_t>$ when the source can deliver beams of higher density or when the above self-focusing mechanism is able to produce few nano-slice beams.

The examples may also include the monitoring and characterization of the longitudinal nanomodulation of beam envelope and its features using, e.g., a Transverse Deflecting cavity diagnostic, including a modification to record and monitor gamma-ray spectra. In other embodiments, the examples may further monitor and measure gamma-ray photon production and distinguish it from Bremsstrahlung and channeling background. The examples may also characterize the nano-wiggler instability by measuring the beam waist and longitudinal profile by resolving sub-micron spatial dimensions and correlate with gamma-ray properties, and characterize the efficiency and properties of gamma-ray photon source as a function of beam and target parameters.

In yet other embodiments, the examples may also include the monitor and characterization of TeV/cm gradient particle acceleration with energy gains ranging from hundreds of MeV to many GeV per millimeter under the beam and target properties: $\sigma_{x,y}\sim r_t$ as well as $n_b\sim<n_t>$.

Example 1: Crunch-In Mode Particle Simulations

In accordance with embodiments of the disclosure, proof of principle of the crunch-in tube wakefield mechanism is established using 3D Particle-In-Cell (PIC) simulations.

Figure 3A:
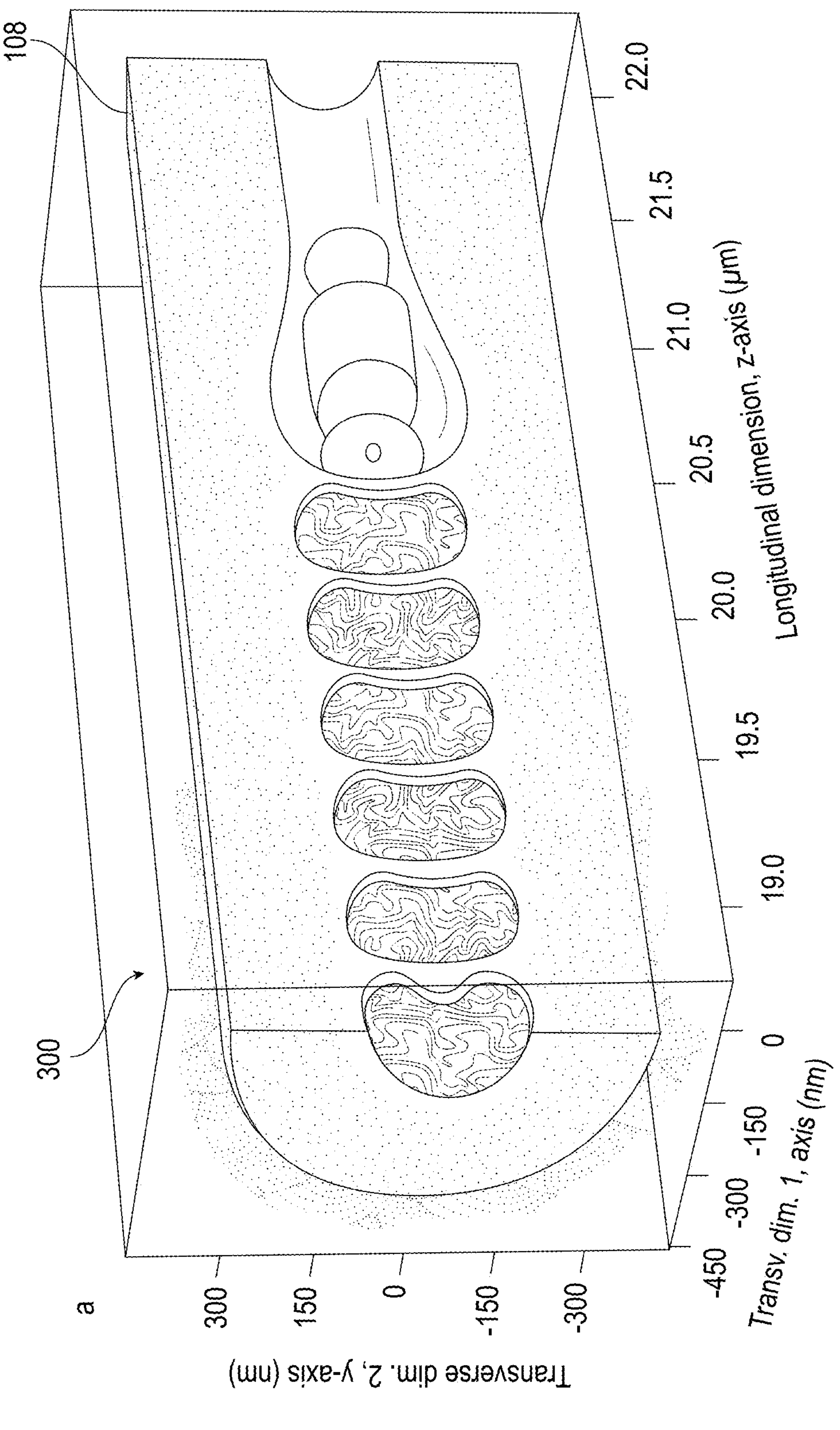
FIG. 3A illustrates a perspective view of electron density in a tube having surface plasmonic crunch-in mode with tens of TV/m EM fields in a nanostructure driven by an electron beam interacting with the tube using 3D Particle-In-Cell (PIC) simulations in accordance with embodiments of the disclosure.
Figure 3B:
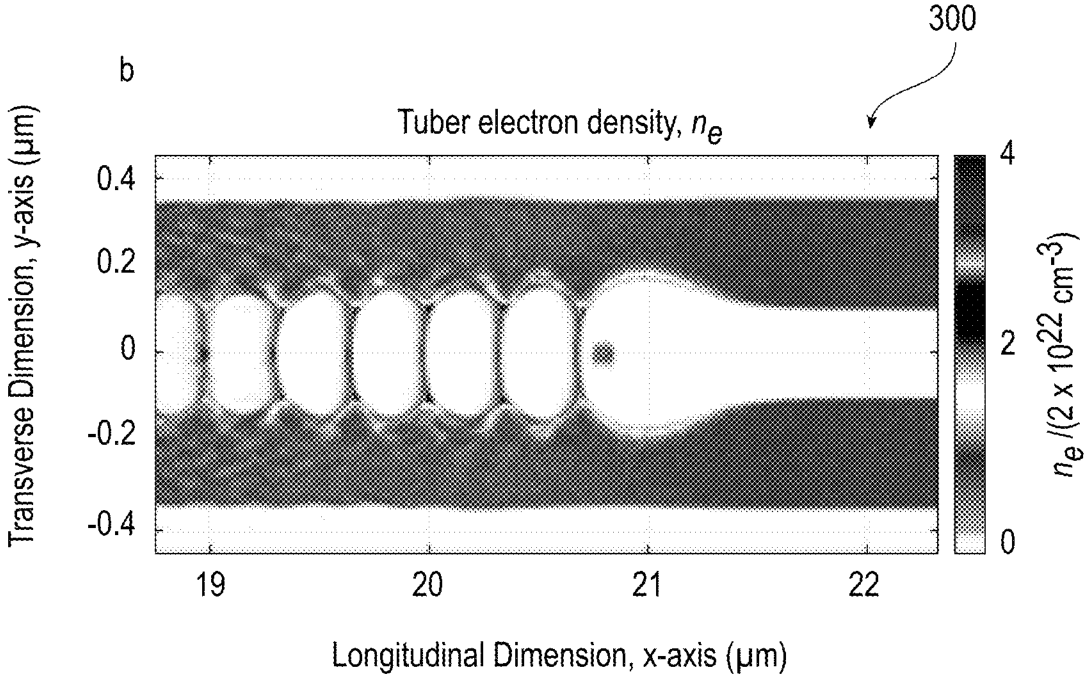
FIG. 3B illustrates a sectional view of electron density in the tube of FIG. 3A in accordance with embodiments of the disclosure.
Figure 3C:
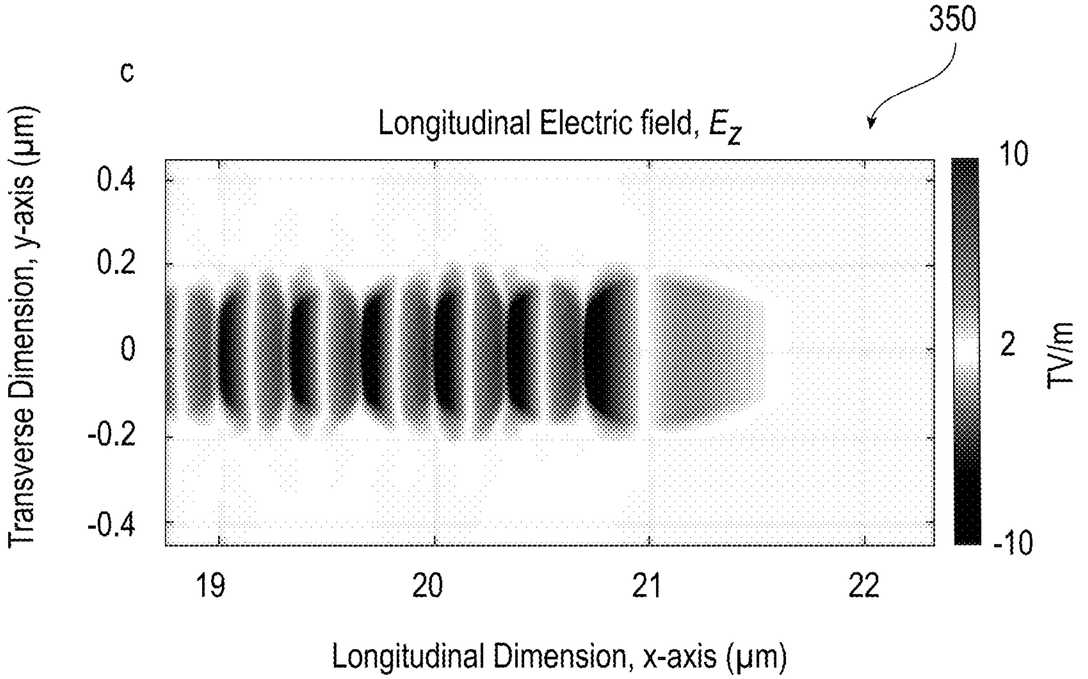
FIG. 3C illustrates a longitudinal field profile of crunch-in tube wakefield of the tube of FIG. 3A in accordance with embodiments of the disclosure.

FIGS. 3A and 3B illustrate 3D PIC simulations with electron density 300, and FIG. 3C illustrates a 3D PIC simulation with longitudinal field profile 350 of crunch-in tube wakefield at around 20 μm of interaction of a $\sigma_z$=400 nm beam with a nanostructured tube 108 of core radius, $r_t$=100 nm. In FIGS. 3A and 3B, the crunch-in tube surface mode driven as wakefield of an electron beam is evident from the 3D PIC electron density. The ionic lattice is stationary over tens of electron oscillations and the particle density is initialized to be zero within the tube core, $|r|<r_t$. Longitudinal fields in excess of 10 TV $m^{-1}$ (10 TV $m^{-1}$ wall focusing fields, see below) are evident in FIG. 3C ($E_{wb}[n_t=2\times10^{22}\ cm^{-3}]=13.6$ TV $m^{-1}$).

The 3D simulations in FIGS. 3A-3C are carried out with epoch code which incorporates quantum electrodynamics (QED) effects. A 3.6×1.52×1.52 $\mu m^3$ Cartesian box with 2 nm cubic cells is setup. The electrons in the tube of wall density, $n_t=2\times10^{22}$ $cm^{-3}$ are modeled using four (4) particles per cell with fixed ions. The tube has a core radius, $r_t$=100 nm and wall thickness, Δw=250 nm. An electron beam of peak density $n_{b0}=5\times10^{21}$ $cm^{-3}$, waist-size $\sigma_r$=250 nm and bunch length $\sigma_z$=400 nm is initialized with 1 particle per cell. The box co-propagates with this ultra-relativistic beam, $\gamma_b$=104, where $\gamma_b$ is a parameter (relativistic factor) to characterize the energy of a beam of charged particles (generally, each particle of a beam has nearly equal energy). In this example, $\gamma_b=10^4$ is arbitrarily chosen because it matches the FACET-II facility. Any $\gamma_b>1$ is applicable. Absorbing boundary conditions are used for both fields and particles.

Figure 4A:
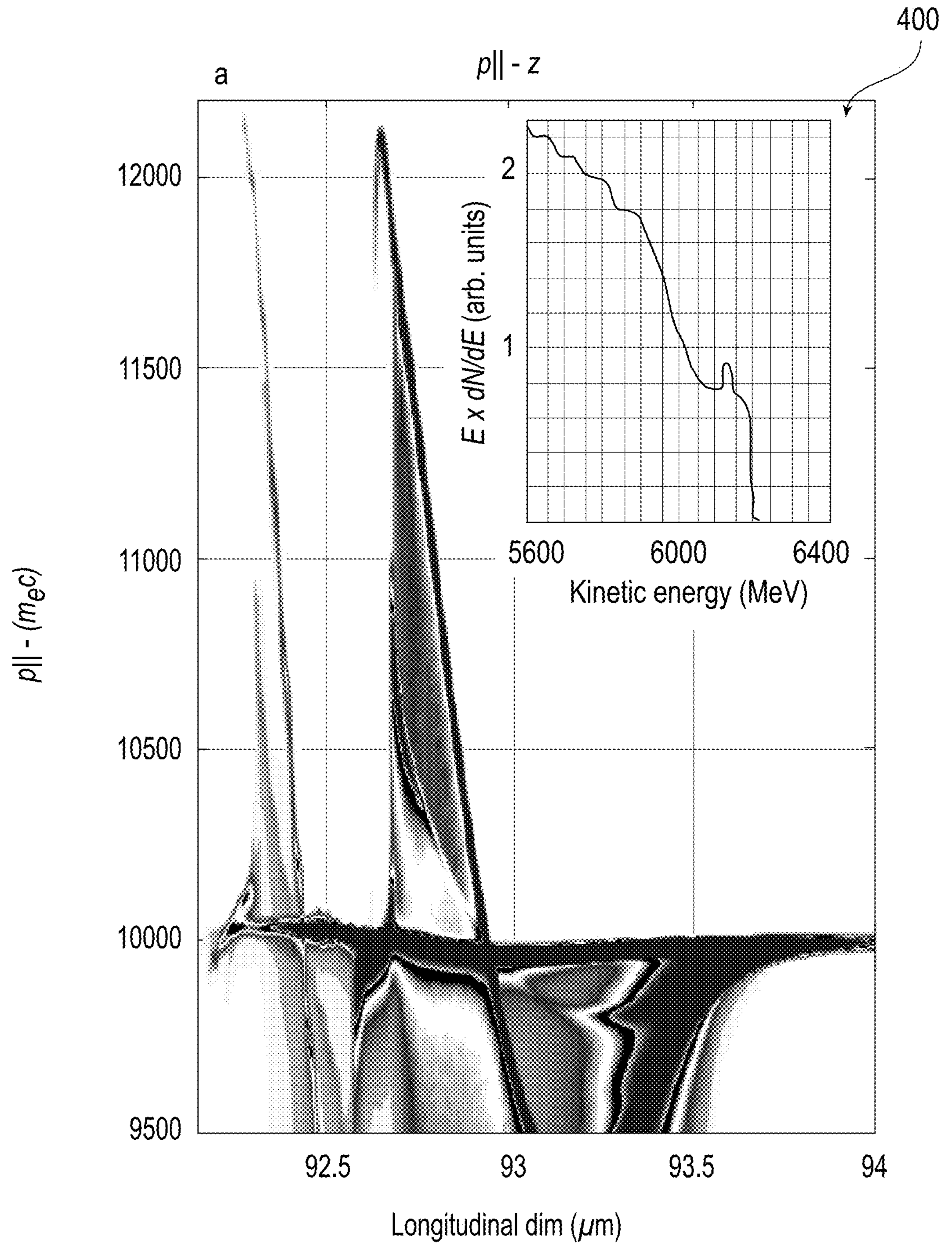
FIG. 4A illustrates a 3D PIC proof-of-principle demonstration of nanostructure accelerator module having an electron density profile of the crunch-in mode in accordance with embodiments of the disclosure.
Figure 4B:
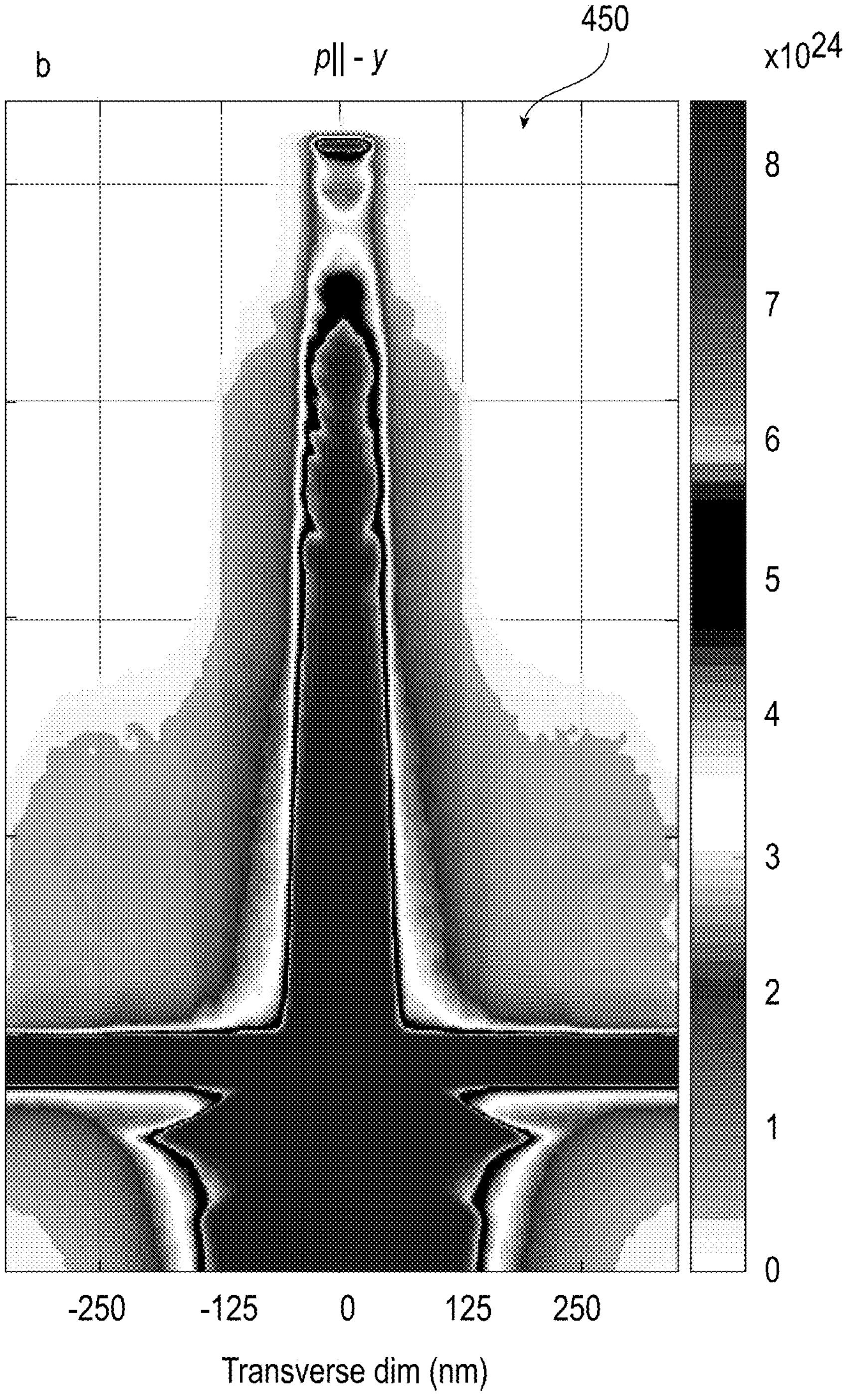
FIG. 4B illustrates a 3D PIC proof-of-principle demonstration of nanostructure accelerator module having tens of TV/m longitudinal EM field profile of the crunch-in mode in accordance with embodiments of the disclosure.

Acceleration of a particle bunch in the tail of the beam is demonstrated by these 3D simulations. FIGS. 4A and 4B illustrate 3D PIC simulation beam phase-spaces for (FIG. 4A) $p_{\|}$-z (energy spectrum inset, reference 400), and (FIG. 4B) $p_{\|}$-y (reference 450) after about 93 μm of interaction with the crunch-in tube wakefields of FIGS. 3A-3C. Energy gain of 1.1 GeV in a 93 μm long tube is inferred from the beam longitudinal momentum phase-spaces in FIGS. 4A and 4B along the (FIG. 4A) longitudinal dimensions, and (FIG. 4B) transverse dimensions. An average acceleration gradient of 11.6 TeV $m^{-1}$ is obtained. The accelerated energy spectra inset in FIG. 4A is un-optimized because the realistic beam used in this proof-of-principle loads the entire range of acceleration phase.

The beam-driven surface crunch-in mode mechanism pioneered using the tunability of nanostructures is demonstrated using a 3D proof-of-principle simulation as described above. The simulation provides proof-of-principle of a GeV of energy gain in 100 μm long nanostructure.

Example 2: Analytical Model of Crunch-In Mode

The crunch-in tube wakefield mode in FIGS. 3A-3C is analytically modeled using collisionless kinetic theory. A charged particle beam propagates in the z-direction at $c\beta_b$ with a density profile, $n_b(r,z)=n_{b0}$ F(r,z) initially Gaussian shaped:

$$\mathcal{F}(r, z) = \exp\left(-\frac{r^2}{2\sigma_r^2}\right)\exp\left(-\frac{(z - z_{max})^2}{2\sigma_z^2}\right),$$

peak density $$n_{b0} = \frac{N_b}{(2\pi)^{3/2}\sigma_r^2\sigma_z},$$

and $$N_b = \int_{-\infty}^{\infty}\int_0^{\infty}\int_0^{2\pi} n_b(r, z)d\theta\, rdr\, dz$$

particles. The beam is sufficiently relativistic, with $\gamma_\beta >> 1$, such that its electric field is predominantly radial.

To facilitate tube wakefields, "blowout" is preferably reduced or mitigated. Blowout drives a net momentum flux of all the tube electrons, $\Delta p(r)$ such that the wall electrons altogether escape the restoring force of the tube ionic lattice. As an extreme case, all the tube electrons within an infinitesimal slice with net charge $$-e\, n_r\pi\left[(r_t + \Delta\omega)^2 - r_t^2\right]dz$$

may bunch together and pile up into a compression layer just outside the outer tube wall, $r_t+\Delta w$. The net force on this layer is $(F_{beam}+F_{ion})\,\Delta t=\Delta p$. If the outward force due to the beam ($F_{beam}$) exceeds the restoring force of tube ions ($F_{ion}$) then blowout occurs. The tube and beam parameters thus have to satisfy the crunch-in condition, $\Delta p<0$, $$n_t\pi\left[(r_t + \Delta\omega)^2 - r_t^2\right] > n_{b0}\sigma_r^2. \quad (1)$$

In the above 3D model, the ratio of the left upon right-hand side of Eq. 1 is greater than 20. It may however be critical to optimize $\Delta w$ for considerations such as optimal wakefield spatial profile, vacuum etc.

The crunch-in kinetic model defines: $r_0$ as the equilibrium position of a tube electron or a wall electron with, $r_t<r_0<_{rt}+\Delta w$; r(z,t) as the instantaneous radial position of an oscillating tube electron; $r_{max}$ as the maximum radius where the driven tube electrons form a compression layer; H as the step function with $H(0^+)=1$ and $H(0^-)=0$ to model the effect of step transition in tube wall density. Note that r(z,t) is an instantaneous location of a tube electron which oscillates. The parameter $r_0$ is the initial condition of an oscillating electron. The parameters $r_t$ and $r_t+\Delta w$" characterize a tube. The condition "$r_t<r_0<r_t+\Delta w$" implies, initially all electrons are inside the tube wall. The condition "$r_0>r_t$" implies that initially all the tube electrons are outside the hollow core. The condition "$r_0$" $r_t+\Delta w$" implies that there are no electrons outside "$r_t+\Delta w$".

The tube electrons which are located at an equilibrium radius less than the electron under consideration that are charged particles at $r_0$ (between $r_0$ and $r_t$) also collectively move with it and compress at the radial extrema. When all the tube electrons with an equilibrium radius between $r_t$ and $r_0$ move together to form a compression layer at a new radial location r, the ionic force on the electron under consideration is:

$$-e\, E_{ion}(r > r_t) = -4\pi e^2 n_t \frac{\left(r^2 - r_t^2\right)}{2_r}.$$

In addition to the ionic force, electrons with an equilibrium radius smaller than $r_0$ which collectively move with the electron under consideration result in a collective field opposite to the ionic field. The collective oscillation condition is that the electrons that originate at an equilibrium position less than $r_0$ collective move to a position just behind r. The force due to collectively moving tube electrons located between $r_0$ and $r_t$ is thus:

$$-e\, E_e\ (r) = 4\pi e^2\ n_t\frac{r_0^2 - r_t^2}{2r}.$$

The dynamics are different during the radially inward moving phase of the oscillation. Due to the zero ion density in the core region of the tube, the collectively moving electrons do not experience any ionic force. However, collectively moving tube electrons that originate between $r_0$ and $r_t$ crunch into the tube core. Inside the core an increase in mutual electrostatic field of the compressing electrons forces them back towards equilibrium. Thus, the net force acting on the electrons is, $$F_{collective} = -m_e\frac{\omega_{pe}^2(n_t)}{2}\frac{1}{r}\left[\left(r^2 - r_t^2\right)\mathcal{H}(r - r_t) - \left(r_0^2 - r_t^2\right)\right]$$

When the tube electrons are driven by a charged particle (e.g. electron or positron) beam with $\text{sgn}[Q_b]=-1(+1)$, the tube electrons are initially pushed radially outwards (inwards). The acceleration of an oscillating electron or a tube wall electron as it traverses across the density discontinuity at the inner surface $r=r_t$ is thus considered, $$\left.\frac{d^2r}{dt^2}\right|_{r=r_t}\mathcal{H}(\text{sgn}[Q_b](r - r_t)).$$

The equation of relativistic ($\gamma_e$) collective surface electron oscillation is $$\gamma_e m_e\frac{\partial^2 r(\xi, z, t)}{\partial t^2} = F_{collective}.$$

Equation of crunch-in surface wave is obtained by transforming to a frame $\xi=c\beta_b t-z$, co-moving with the driver ($\beta_b$ for an x-ray laser is its group velocity) and using $\partial\xi=(c\beta_b)^{-1}\partial t$. By including the force of the ultrashort drive bunch, the driven crunch-in surface wave equation is, $$\frac{\partial^2 r}{\partial\xi^2} + \frac{1}{2}\frac{\omega_{pe}^2(n_t)}{\gamma_e c^2\beta_b^2}\frac{1}{r}\left[\left(r^2 - r_t^2\right)\mathcal{H}(r - r_t) - \left(r_0^2 - r_t^2\right)\right] + \quad (2)$$

-continued $$\left.\frac{\partial^2 r}{\partial \xi^2}\right|_{r=r_t} \mathcal{H}(\mathrm{sgn}[Q_b](r-r_t)) = -\mathrm{sgn}[Q_b]\frac{\omega_{pe}^2(n_t)}{\gamma_e c^2\beta_b^2}\frac{n_{b0}(\xi)}{n_t}\int_0^r dr\,\mathcal{F}(r,z,\xi)$$

With a Gaussian beam envelope, $$\int_0^r dr\,\mathcal{F}(r,z,\xi) = \frac{\sigma_r^2}{2_\pi}\left[1-\exp\left(-\frac{r^2}{2\sigma_r^2}\right)\right]r^{-1}\exp\left(-\frac{(z-z_{max})^2}{2\sigma_z^2}\right)$$

and under flat-top condition, $s_r >> r_t$ maxima of the radial trajectory, $r=r_m$ is obtained from Eq. 2. At this maxima, force of the drive beam equals that of the collective charge separation field. The electrons located between $r_m$ and $r_t$ collectively move and bunch into a compression layer located at $$r_m = r_t\left(1-\frac{n_{b0}}{n_t}\frac{2\pi\sigma_r^2}{\pi(r_t+\Delta_w)^2}\right)^{-1/2}.$$

The net charge of the electron compression layer that collectively crunches from the tube wall into its core can be estimated. During this crunch-in phase the displaced electrons fall into the core region up to a minimum radius, $r_{min}$. The net charge that falls into the core region is.

$$\delta Q_{max}(r_{min}) = -en_t\pi r_t^2\left(\frac{n_{b0}2\pi\sigma_r^2}{n_t\pi(r_t+\Delta\omega)^2 - n_{b0}2\pi\sigma_r^2}\right)dz.$$

The radial electric field is thus obtainable applying the Gauss's law on $\delta Q_{max}$. Although an analytical expression for $r_{min}$ can be obtained, we consider $r_{min}=r_t/\alpha$. The radial electric field is $$E_{t-r} = -\alpha\ n_t\ 2\pi r_t\left(\frac{en_{b0}2\pi\sigma_r^2}{n_t\pi(r_t+\Delta\omega)^2 - n_{b0}2\pi\sigma_r^2}\right)$$

which simplifies to, $$E_{t-r} = -\alpha\sqrt{\frac{2}{\pi}}\frac{Q_b[pC]}{\sigma_z[100\text{ nm}]}\frac{1}{r_t[100\text{ nm}]}\times\left(\left(\frac{r_t+\Delta\omega}{r_t}\right)^2 - 2\frac{n_{b0}}{n_t}\frac{\sigma_r^2}{r_t^2}\right)^{-1}\frac{TV}{m} \quad (3)$$

The peak longitudinal electric field is derived using the Panofsky-Wenzel theorem, $$E_{t-r}\Delta r = E_{t-z}\Delta\xi.$$

The value of $E_{t-z}$ varies over $\kappa\sqrt{\gamma_e}\,2\pi c/\omega_{pe}(n_t)$, where $\kappa$ is the shortened phase of the nonlinearly steepened surface wave, where the tube electrons crunch into its core. The relativistic factor, $$\gamma_e \sim \left[1+(p_r/(m_e c))^2\right]^{1/2}$$

reduces the oscillation frequency as $\omega_{pe}(n_t)/\sqrt{\gamma_e}$. Using $$p_r = \frac{F_{beam}\sigma_z}{c} = 4\pi e^2 n_t c^{-1} n_{b0} n_t^{-1} r_t \sigma_z (4\pi)^{-1},$$

the peak longitudinal field is thus, $$E_{t-z} = E_{t-r} r_{min}(\kappa 2\pi c)^{-1}\omega_{pe}(nt)\gamma e^{-1/2}; \quad (4)$$

or, $$E_{t-z} = -\frac{2}{\kappa}\frac{\sqrt{n_t[10^{22}\text{cm}^{-3}]}}{\sqrt{r_t[100\text{ nm}]}}\sqrt{Q_b[pC]}\frac{\sigma_r}{\sigma_z}\times\left(\left(\frac{r_t+\Delta w}{r_t}\right)^2 - 2\frac{n_{b0}}{n_t}\frac{\sigma_r^2}{r_t^2}\right)^{-1}\frac{TV}{m}.$$

The expressions of tube wakefield in Eq. 3 and Eq. 4 are applicable if the crunch-in condition in Eq. 1 is strictly satisfied. Moreover, closer to the critical point in Eq. 1 the wakefield amplitudes depend on the ratio.

For $n_t=2\times10^{22}$ cm$^{-3}$, $r_t=100$ nm and $Q_b=315$ pC, $\sigma_z=250$ nm, $\sigma_z=400$ nm; $r_m=74.5$ nm, $E_{t-r}=\alpha$ 8.96 TV/m (Eq. 3) and $E_{t-z}=\kappa^{-1}$ 3.5 TV/m (Eq. 4) in good agreement with the above 3D simulation.

The beam envelope in Eq. 2 is considered to be quasi-stationary over several surface oscillations. Transverse envelope oscillations however result in the variation of beam spatial profile, $F(r,z,\xi)$ and peak density, $n_{b0}(\xi)$.

Example 3: Radiation Production—Nanomodulation and Self-Focusing

Figure 5A:
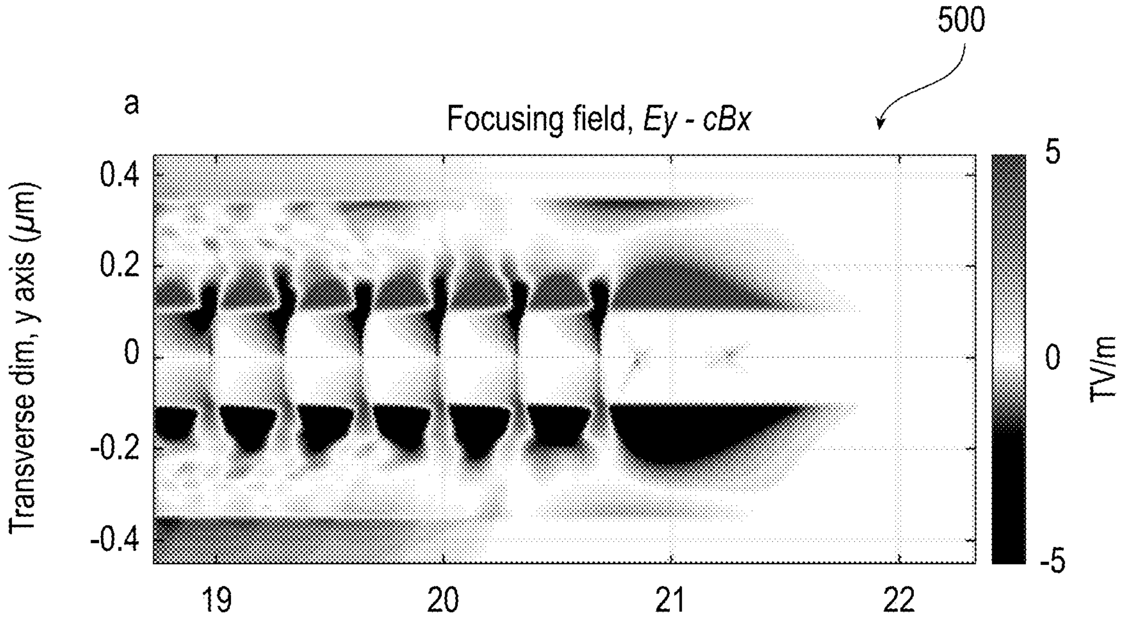
FIG. 5A illustrates a 3D PIC model of tens of TV/m focusing field of the crunch-in mode in nanoporous media in accordance with embodiments of the disclosure.
Figure 5B:
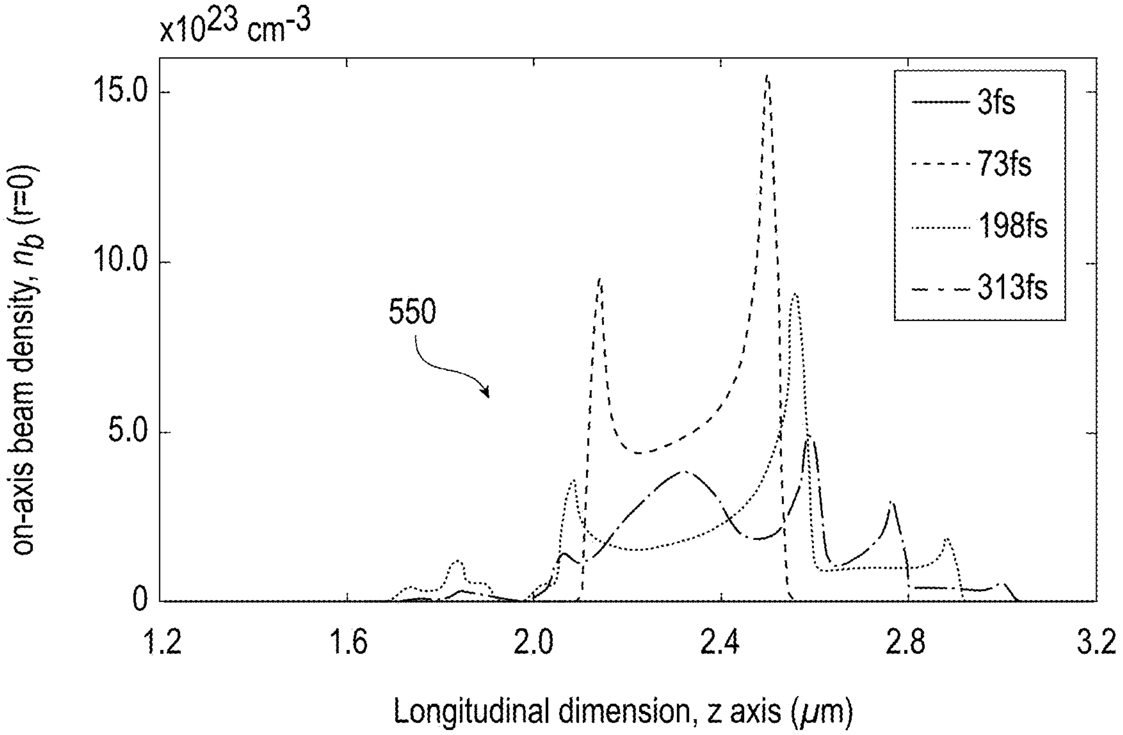
FIG. 5B illustrates a 3D PIC model of self-focused & nanomodulated beam (on-axis density profile) in accordance with embodiments of the disclosure.

FIGS. 5A and 5B illustrate a 3D PIC (FIG. 5A) tube focusing wakefield 500, and (FIG. 5B) on-axis beam density 550 which demonstrates the nanomodulation effect. The tube focusing fields and nanometric transverse beam oscillations from the above 3D simulation are elucidated in FIGS. 5A and 5B. The beam of charged particles within $r_m>r_b>r_t$ experience transverse focusing and the tube wall electrons are forced into the core which results in the folding in of the "wings" of the beam.

The parameter $r_b$ signifies the radial location of beam electrons. The beam electrons are different from the tube electrons. The condition "$r_m>r_b>r_t$" implies that the beam is wider than the tube hollow core, such that the beam particle overlaps with the tube wall.

The parameter $r_m$ is the extrema of the tube electrons as the tube electrons oscillate like a pendulum in the radial direction. The parameter $r_m$ is related to "$r_t+\Delta w$" in the sense that $r_m$ has to be less than $r_t+\Delta w$, otherwise the tube electrons or wall electrons fly outside the tube. Note that, the parameters $r_m$ and $r_0$ refer to the tube electrons, whereas the parameter r refers to the location of beam electrons.

In the case as illustrated in FIGS. 5A and 5B, the beam physically overlaps with the tube wall and thus meets the condition of $r_m>r_b>r_t$. The beam develops significant nanomodulation with spatial frequencies corresponding to $\lambda_{osc}\sim O(100\text{ nm})$ as shown in FIG. 5B. Moreover, the peak on-axis beam density $n_{b0}(\xi)$ rises to many ten times its initial density, $$n_{b0}(\xi=0) = 5\times10^{21}\ \text{cm}^{-3}.$$

With this rapid rise in the beam density the tube wakefield amplitude approaches the wavebreaking limit.

The O(100 MeV) high-energy radiation ($E_{ph}$=hc $2\gamma_b^2/\lambda_{osc}$) produced by nanometric oscillations of ultra-relativistic particles of the beam in the 10 TV $m^{-1}$ wall focusing fields from a nanometric source size (~$r_t$) offers a nano-wiggler photon source. Furthermore, variation of tube wall density (nanolattice) or inner radius (corrugated nanostructure) can be used to further enhance the beam oscillations and thus the radiation characteristics.

The 3D PIC and analytical modeling demonstrates that near solid submicron multi-GeV particle bunch (e.g. electron bunch) can effectively excite O(TV $m^{-1}$) longitudinal crunch-in wakefields in nanostructures, such as a tube of 200 nm core diameter. It was surprisingly found that nonlinear surface crunch-in waves can sustain many TV $m^{-1}$ focusing wakefields in the tube walls which result in more than an order of magnitude increase in the peak beam density and hundred nm electron beam density modulation. The resulting accelerating fields can reach unprecedentedly high levels to allow the demonstration of O(GeV) energy gains in mm long tubes. In addition, induced nanomodulation facilitates controlled O(100 MeV) radiation production using the nanometric transverse oscillations of the beam particles.

Example 4: Self-Focusing to Ultra-Solid Nano-Sliced

Figure 7A:
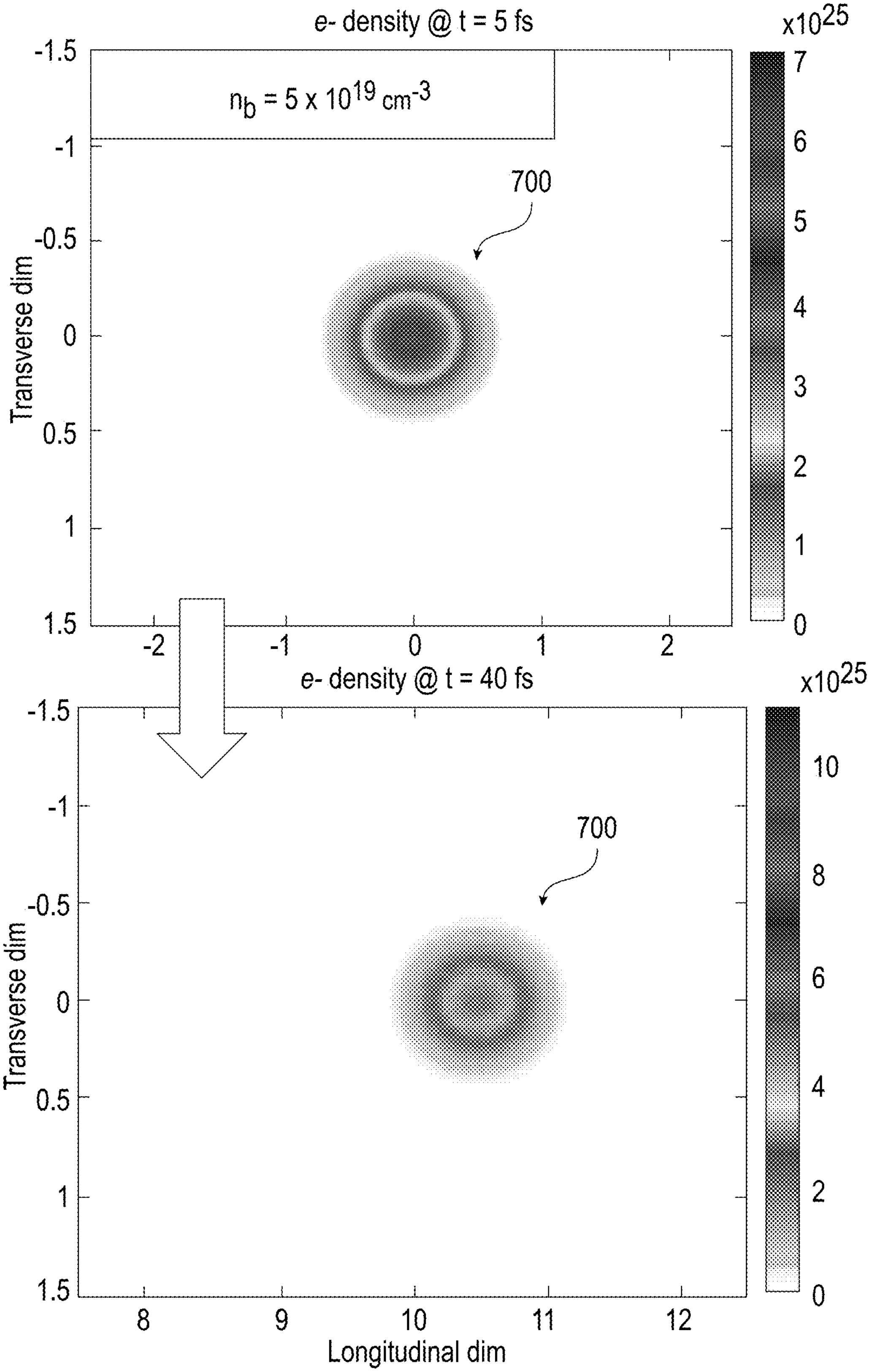
FIGS. 7A and 7B illustrate 2.5D PIC models of self-focusing and nano-slicing in nanoporous materials with $r_t$=20 nm core regions in accordance with embodiments of the disclosure.
Figure 7B:
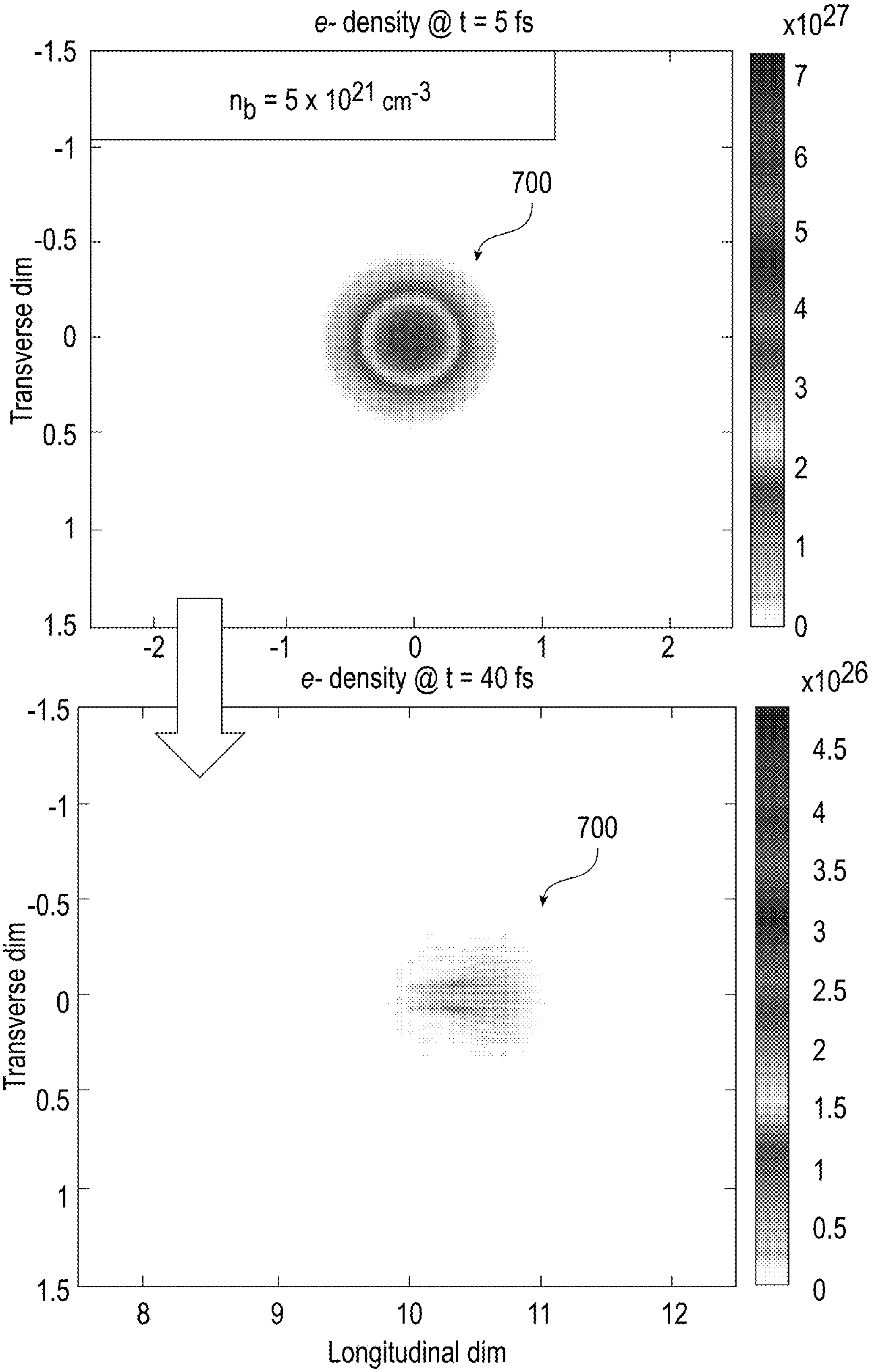

FIGS. 7A and 7B illustrate 2.5D PIC models of electron beam density 700 for self-focusing and nano-slicing in nanoporous materials with $r_t$=20 nm core regions in accordance with embodiments of the disclosure. The sub-micron (e.g. 100s of nm) beam parameters are currently available at FACET-II for conducting research on excitation of nanoplasmonic modes suited for nanostructure wiggler and accelerator. With sample dimensions and interaction lengths being in millimeter, the beam beta function can be a few centimeters.

As shown in FIGS. 7A and 7B, self-focused (density increase) and nano-sliced beams are for a tube wall density $n_t$ equal to $2\times10^{22}$ $cm^{-3}$, a radius $r_t$ equal to 20 nm. The color (grayscale) bar is in $m^{-3}$ units for electron beam density 700. Also, a left panel has a beam density $n_b$ equal to $5\times10^{19}$ $cm^{-3}$ (tens of kA), while a right panel has a beam density $n_b$ equal to $5\times10^{21}$ $cm^{-3}$ (hundreds of kA). For the simulations, a Gaussian beam waist-size is 250 nm and a bunch length is 400 nm. In the left panel, self-focusing doubles the nano-slice density, while in the right panel, the beam density increases by order of magnitude towards ultra-solid nano-slice.

Example 5: Gamma-Ray Nano-Wiggler with Ultra-Solid Beam

The nanostructure tube crunch-in regime sustains many TV $m^{-1}$ focusing fields in the tube walls, which can capture and guide a high energy charged particle beam (unlike linear surface fields) in a continuously focusing channel causing envelope modulations that have hundreds of nanometer spatial scale. The self-focusing and nanomodulation effect results in more than an order of magnitude increase in the peak beam density towards ultra-solid beams. The resulting significant increase in the peak beam density leads to even higher accelerating fields (as shown in FIG. 5A).

In the nonlinear crunch-in mode, the beam particles at $r_b$ experience focusing forces of the mode. Under the condition $r_m>r_b>r_t$ the beam is wider than the tube hollow core, such that the beam particle overlaps with the tube wall, and the particle undergoes transverse focusing under tens of TV/m transverse fields and the beam electrons are forced into the core. This self-focusing effect results in the folding-in of the "wings" of the beam. As a result of self-focusing, the beam develops significant longitudinal nanomodulation with spatial frequencies corresponding to $\lambda_{osc}$~O(100 nm) (as shown in FIG. 5B).

Figure 8A:
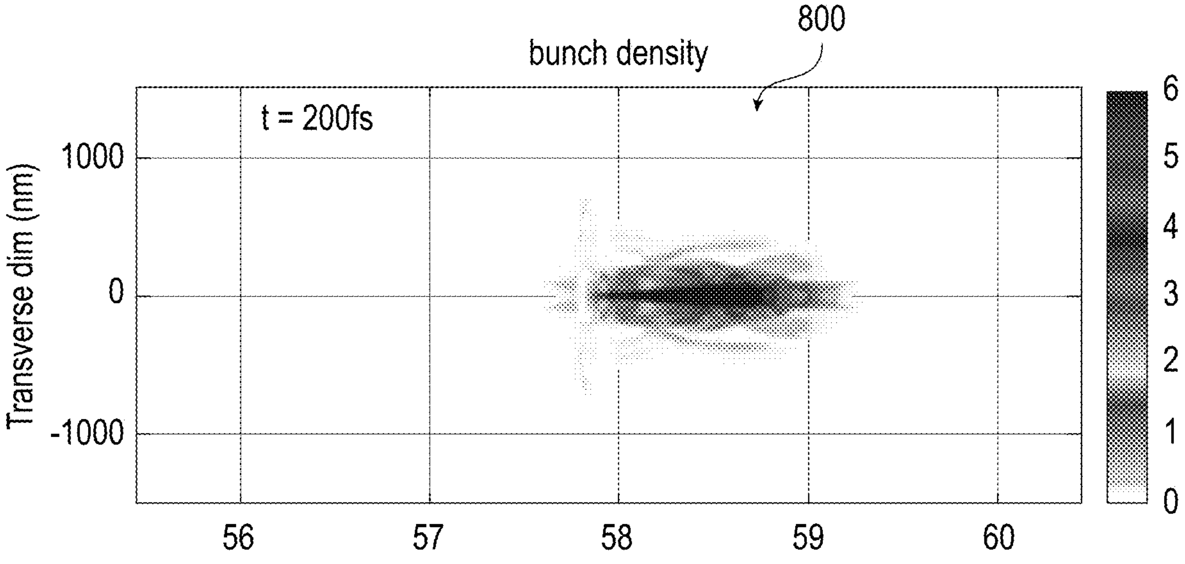
FIG. 8A to FIG. 8D illustrate 3D PIC models of beam profiles in 2D, on-axis beam density (blue or grayscale, FIGS. 8A and 8B), on-axis longitudinal field (red or grayscale, FIGS. 8C and 8D) in accordance with embodiments of the disclosure.
Figure 8B:
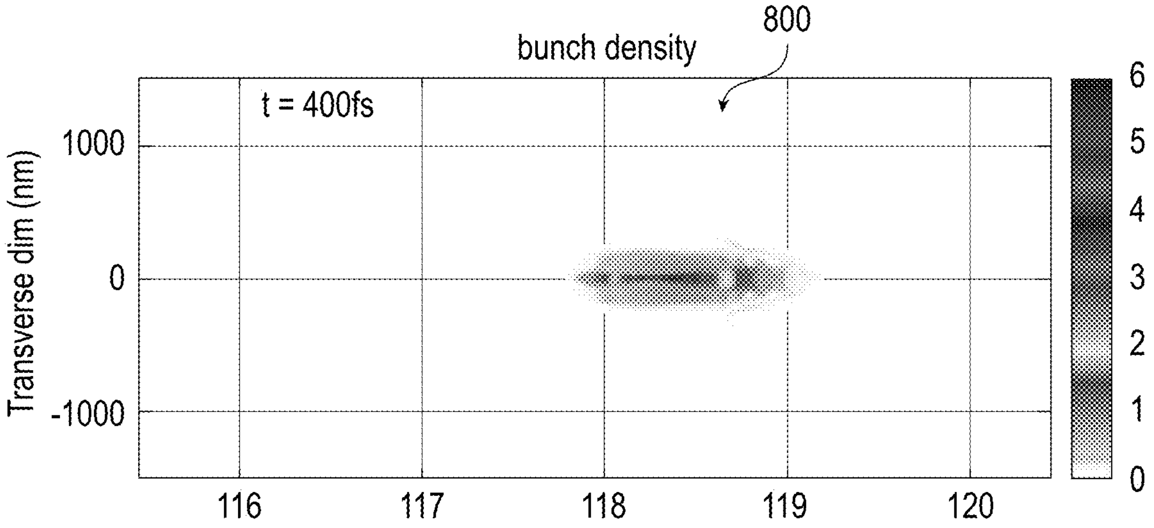
Figure 8C:
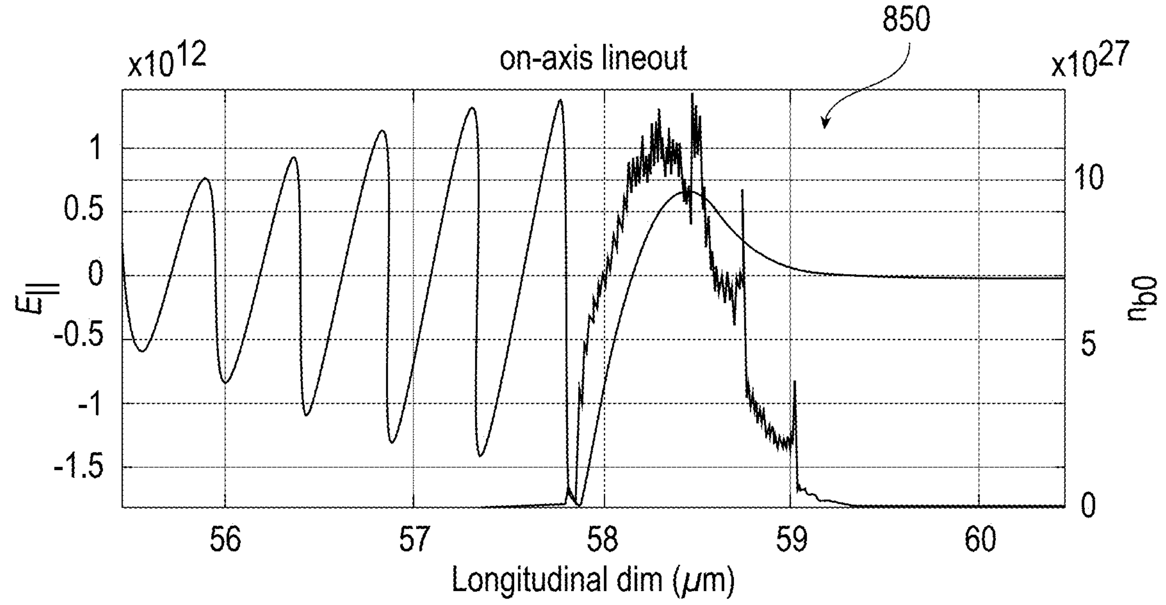
Figure 8D:
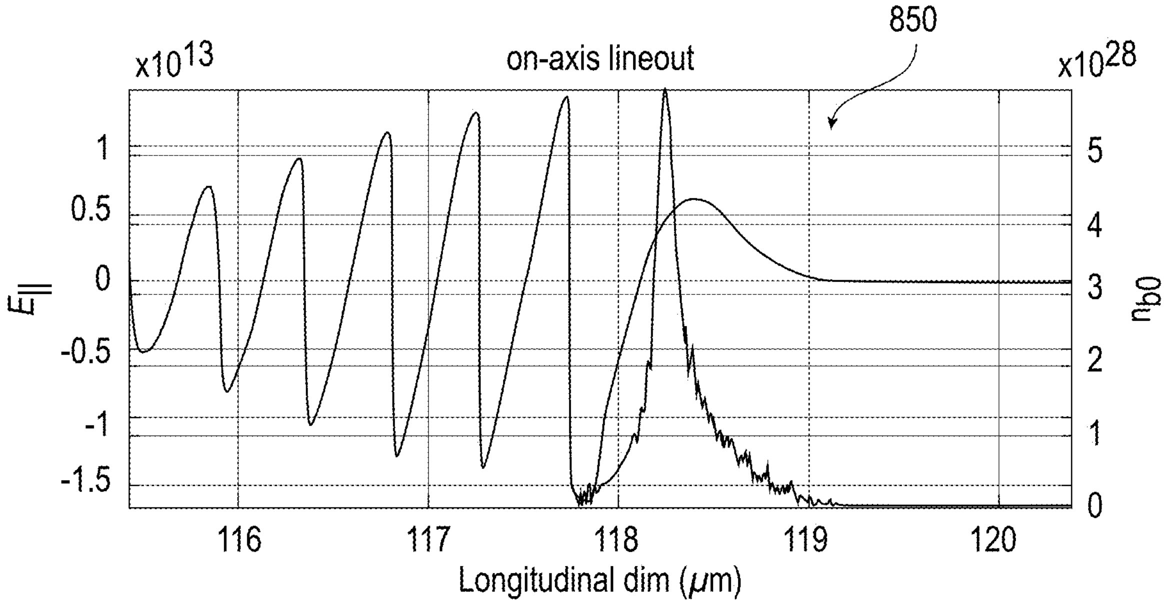

Nanometric oscillations of ultra-relativistic particles of the beam in the tens of TV $m^{-1}$ wall focusing fields produce O(100 MeV) high-energy photons ($E_{ph}$=2hc $\gamma^2_{beam}$ $\lambda^{-1}_{osc}$) from a nanometric source size (~$r_t$) which offers a "nano-wiggler" light source. Self-focusing and nanomodulation of the beam envelope resulting in extreme compression of the beam to ultra-solid densities is demonstrated using 3D PIC simulations for bunch density 800 in FIGS. 8A to 8B, and on-axis lineout 850 in FIGS. 8C to 8D. Furthermore, variation of tube wall density (nanolattice) or inner radius (corrugated nanostructure) can enhance the beam oscillations and thus the radiation characteristics.

Example 6—Particle Tracking and Bunch Lengths

A single electron bunch with the following parameters is provided based upon the representative design parameters for FACET-II. Using the FACET-II electron bunch, near-solid beam density of >$10^{19}$ $cm^{-3}$ may help strong excitation of nanoplasmonic modes. Exemplary beam properties are shown in Table 1.

TABLE 1

| Charged Particle Beam Properties | |
|---|---|
| Energy (rms) | 10 GeV |
| Energy spread (rms) | <1.5% |
| Charge | 1-3 nC |
| Bunch Length, $\sigma_z$ (rms) | 0.1-3 μm |
| Spot size, $\sigma_{x,y}$ (rms) | 0.1-15 μm |
| Normalized emittance, $\gamma\varepsilon_{x,y}$ | 1-30 mm-mrad |

In certain embodiments, a staged approach may be used to build upon the availability of beams starting from tens of kA for an initial stage to many MA at later stages. Furthermore, the surface crunch-in nanoplasmonic mode may drive self-focusing of the beam to ultra-solid densities even when starting from near solid beams of ~$10^{19}$ $cm^{-3}$. These self-focused ultra-solid beams from the initial stage can very well be used for the experimental verification of TeV/cm nano-wiggler and nano-accelerator.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A system for accelerating charged particles and producing high energy photons, the system comprising:

a nanofabricated nanostructure comprising a conductive medium formed of at least one tube having a hollow core channel surrounded by a wall comprised of a nanomaterial having wall electrons comprising a free electron gas of conduction band electrons and wall ions; and a first beam of charged particles having a quasi-solid beam density greater than $10^{18}$ $cm^{-3}$;

wherein the nanostructure is configured with an internal radius of said wall and an effective wall electron density of said wall electrons selected to interact with the first beam of charged particles, wherein the effective wall electron density is greater than or equal to the quasi-solid beam density;

wherein the quasi-solid beam density of the first beam of charged particles is selected between 0.01 and 100 times the effective wall electron density with a beam waist radius selected between 0.1 and 100 times the internal radius of said wall;

wherein, via said nanostructure interacting with the first beam of charged particles, a plasmonic mode is excited in the nanostructure and the first beam of charged particles gains energy and/or momentum at a rate greater than 1 TeV per meter along a longitudinal direction of the at least one tube, and wherein, via said plasmonic mode being excited, the first beam of charged particles undergoes focusing in a transverse direction with respect to the at least one tube to form a second beam of charged particles, the second beam of charged particles having a quasi-solid beam density at least an order of magnitude greater than that of the first beam of charged particles; and wherein the nanostructure is configured to generate high energy photons via modulation of the second beam of charged particles.

2. The system of claim 1, wherein the nanostructure comprises a plurality of substantially similar instances of the at least one tube, formed of the conductive medium or one or more conductive media containing the free electron gas of conduction band electrons, in an ordered arrangement thereof.

3. The system of claim 1, wherein the beam waist radius of the first beam of charge particles is between 100 nm and 15 micron, and:

wherein the internal radius of the wall of the at least one tube is substantially equal to the beam waist radius of the first beam of charged particles;

wherein the internal radius of the wall of the at least one tube is less than the beam waist radius of the first beam of charged particles, wherein at least half of the first beam of charged particles propagate outside said wall in a radial direction, perpendicular to the longitudinal direction; or wherein the internal radius of the wall of the at least tube is greater than the beam waist radius of the first beam of charged particles, wherein at least half of the first beam of charged particles propagate within said wall in a radial direction, perpendicular to the longitudinal direction.

4. The system of claim 1, wherein:

the nanostructure is configured for the wall electrons comprising the free electron gas of conduction band electrons to generate an electromagnetic field responsive to interaction with the first beam of charged particles, wherein the wall ions remain substantially stationary and the generated electromagnetic field has a net transverse component, perpendicular to the longitudinal direction; and wherein the nanostructure is configured to generate the high energy photons via the modulation of the second beam of charged particles with a net transverse component of the generated magnetic field, perpendicular to the longitudinal direction.

5. The system of claim 1, wherein the nanomaterial is adapted for the wall electrons to oscillate in a radial direction, transverse to the longitudinal direction, wherein the plasmonic mode is excited in the nanostructure responsive to propagation of the first beam of charged particles along at least a portion of the hollow core channel, and wherein an amplitude of the plasmonic mode is responsive to resonance with a beam characteristic of the first beam of charged particles, the beam characteristic being selected from bunch length, beam length, the beam waist radius, charge density, the quasi-solid beam density, or a combination thereof.

6. The system of claim 1, wherein the nanostructure is configured for the wall electrons to generate a transverse focusing electromagnetic field amplitude of at least 1 TV $m^{-1}$ responsive to interaction with the first beam of charged particles, wherein the plasmonic mode comprises a surface plasmonic mode with a spatial frequency corresponding to an oscillation wavelength of 10 nm to 1 micron.

7. The system of claim 6, wherein the nanostructure is configured to produce the high energy photons via transverse nanometric oscillation or nanomodulation of the second beam of charged particles in the transverse focusing field, wherein the high energy photons have energies greater than 1 MeV, or greater than 10 MeV.

8. The system of claim 1, wherein the effective wall electron density of the wall electrons is $10^{21}$ $cm^{-3}$ to $10^{24}$ $cm^{-3}$ and/or the internal radius of the wall of the at least one tube is between 20 nm and 200 nm; or wherein the nanomaterial is porous at or proximate the wall of the at least one tube.

9. The system of claim 1, wherein the wall of the at least one tube is solid or comprised of a nanoporous metal, or further comprising a nanomaterial coating disposed in or on said wall, the nanomaterial coating comprising a nanoporous metal or having a tunable property selected from structure, dimension, density, and composition.

10. The system of claim 1, wherein the nanomaterial has a conduction band electron density adapted to excite the plasmonic mode responsive to interaction with the first beam of charged particles, wherein the plasmonic mode sustains an electromagnetic field amplitude greater than 1 TV $m^{-1}$ in the transverse direction.

11. The system of claim 10, wherein the nanostructure is configured for the first beam of charged particles to gain the energy and/or momentum at a rate of at least 1 GeV per millimeter along the longitudinal direction, to have an average acceleration gradient of at least 2 TeV $m^{-1}$ along the longitudinal direction, or for focusing the second beam of charged particles to have said quasi-solid beam density greater than $10^{22}$ $cm^{-3}$, or a combination thereof.

12. The system of claim 10, wherein the nanostructure is configured to interact with the first beam of charged particles having a bunch length ranging from 10 nm to 30.0 micron, or wherein the at least one tube has a length of between 0.1 micron to $10^6$ micron along the longitudinal direction.

13. The system of claim 1, further comprising:

a mechanical stage having one or more motors adapted to hold the nanostructure and/or to move the nanostructure along one or more of three orthogonal axes; and/or a beam focusing mechanism having one or more plasma lenses or magnets configured to focus the beam waist radius of the first beam of charged particles prior to interaction with the nanostructure, wherein said beam waist radius is focused to less than one micron, or to 100 nm or less, and wherein the first beam of charged particles has a bunch length dimension of 10 micron or less, or less than 1 micron.

14. The system of claim 1, wherein the first beam of charged particles comprise one or more of electrons, positrons, or protons, and further comprising a monitoring module with a computer processor, one or more sensors and one or more imagining systems configured to analyze one or more properties of the electrons, positrons or protons, or of the high-energy photons, and to provide an indication of the properties.

15. The system of claim 2, wherein the nanostructure comprises a tube array comprising the plurality of instances of said at least one tube, or at least 100 such instances of said at least one tube, or between 100 and 1000 such instances.

16. The system of claim 15, wherein the nanostructure comprises one or both of:

a second tube array disposed in a stacked orientation with respect to said tube array and having at least one second tube configured to extend an effective length of said at least one tube along the longitudinal direction; and a third tube array disposed in a stacked orientation with respect to the second tube array and having at least one third tube configured to further extend an effective length of said at least one tube along the longitudinal direction.

17. A method comprising:

providing a nanofabricated nanostructure comprising a conductive medium formed of at least one tube comprised of a nanomaterial and having a wall defining a hollow core channel extending along a longitudinal axis therein, the nanostructure comprising the least one tube having said hollow core channel surrounded by the wall, the wall comprised of said nanomaterial having wall electrons comprising a free electron gas of conduction band electrons and wall ions;

generating an electromagnetic field by the nanostructure interacting with a first beam of charged particles propagating along the longitudinal axis, wherein the nanostructure is configured with an internal radius of said wall and an effective wall electron density of said wall electrons selected to interact with said first beam of charged particles having a solid or quasi-solid beam density greater than $10^{18}$ $cm^{-3}$, wherein the effective wall electron density is greater than or equal to the solid or quasi-solid beam density;

wherein the solid or quasi-solid beam density of the first beam of charged particles is selected between 0.01 and 100 times the effective wall electron density with a beam waist radius selected between 0.1 and 100 times the internal radius of said wall;

wherein, via said nanostructure interacting with the first beam of charged particles, a plasmonic mode is excited along the wall and the electromagnetic field has an amplitude of at least 1 TV $m^{-1}$, wherein the first beam of charged particles gains or loses energy and/or momentum at a rate greater than 1 TeV per meter along a longitudinal direction of the at least one tube;

focusing the first beam of charged particles via said plasmonic mode being excited, wherein the first beam of charged particles undergoes focusing in a transverse direction with respect to the at least one tube to form a second beam of charged particles;

wherein an energy density of the charged particles is increased along the longitudinal axis and the second beam of charged particles has a solid or quasi-solid beam density of at least an order of magnitude greater than that of the first beam of charged particles; and modulating the focused beam of charged particles via the electromagnetic field, wherein high energy photons having energy of at least 1 MeV are generated by oscillation of the focused beam in a transverse direction, perpendicular to the longitudinal axis.

18. The method of claim 17, wherein the electromagnetic field has a spatial frequency corresponding to an oscillation frequency of the plasmonic mode.

19. The method of claim 18, wherein the plasmonic mode is generated in the free electron gas of the nanomaterial responsive to resonance with the solid or quasi-solid beam density of the first beam of charged particles, or a charge density, beam length, or bunch length of the first beam of charged particles, or a combination thereof.

20. The method of claim 17, further comprising focusing the first beam of charged particles for the second beam of charged particles to have a beam waist radius of 100 nm or less prior to interacting with the nanostructure, or a beam waist radius of 10 nm or less upon interacting with the nanostructure.

21. The method of claim 17, wherein modulating the second beam of charged particles comprises transverse nanometric oscillation or nanomodulation of the second beam of charged particles via the electromagnetic field, wherein a light source comprising the high energy photons is defined, and further comprising directing the light source toward a semiconductor manufacturing fixture, an imaging system, or a spectroscopy system.

22. A system comprising:

a nanofabricated nanostructure having at least one tube with a wall comprised of a nanomaterial defining a hollow core channel, the nanostructure comprising the least one tube having said hollow core channel surrounded by the wall, the wall comprised of said nanomaterial having wall electrons comprising a free electron gas of conduction band electrons and wall ions; and a first beam of charged particles having a solid or quasi-solid beam density greater than at least $10^{18}$ $cm^{-3}$;

wherein the nanostructure is configured with an internal radius of said wall and an effective wall electron density of said wall electrons selected to generate an electromagnetic field via interaction with the first beam of charged particles propagating in a longitudinal direction of the at least one tube, wherein the effective wall electron density is greater than or equal to the solid or quasi-solid beam density of the first beam of charged particles;

wherein the nanostructure is configured to interact with the first beam of charged particles having a solid or quasi-solid beam density of greater than at least $10^{18}$ $cm^{-3}$ and the solid or quasi-solid beam density of the first beam of charged particles is selected between 0.01 and 100 times the effective wall electron density with a beam waist radius selected between 0.1 and 100 times the internal radius of said wall;

wherein, via said interaction of the nanostructure with the first beam, a plasmonic mode is excited in the nanostructure along the wall via the interaction, wherein the electromagnetic field has an amplitude of at least 1 TV $m^{-1}$;

wherein, via said plasmonic mode being excited, energy and/or momentum of the first beam of charged particles increases at a rate of at least 1 TeV $m^{-1}$ along the longitudinal direction, wherein the first beam of charged particles gains or loses said energy and/or momentum at a rate greater than 1 TeV per meter along the longitudinal direction;

wherein the first beam of charged particles undergoes focusing in a transverse direction with respect to the at least one tube, perpendicular to the longitudinal direction, to form a second beam of charged particles;

wherein the solid or quasi-solid beam density of the first beam of charged particles increases by at least an order of magnitude, the second beam of charged particles having a solid or quasi-solid beam density at least an order of magnitude greater than that of the first beam of charged particles; and wherein high energy photons with energy of at least 1 Me V are generated by modulating the focused beam of charged particles, responsive to the electromagnetic field.

23. The system of claim 22, wherein the beam waist radius of the first beam of charge particles is between 100 nm and 15 micron, and:

wherein the internal radius of the wall of the at least one tube is substantially equal to the beam waist radius of the first beam of charged particles;

wherein the wall has the internal radius less than the beam waist radius of the first beam of charged particles, with at least half of the charged particles propagating outside said wall; or wherein the wall has the internal radius greater than the beam waist radius of the first beam of charged particles, with at least half of the charged particles propagating inside said wall.

24. The system of claim 22, wherein:

the effective electron density of the wall electrons is at least $10^{21}$ $cm^{-3}$ to $10^{24}$ $cm^{-3}$; and/or the internal radius of the wall of the at least one tube is between 20 nm and 200 nm.

25. The system of claim 22, wherein the electromagnetic field further has an amplitude of at least 1 TV $m^{-1}$ in the transverse direction with a spatial frequency corresponding to an oscillation frequency of the plasmonic mode, and wherein the high energy photons are generated by transverse nanometric oscillation or nanomodulation of the second beam of charged particles, responsive to resonance of the plasmonic mode with a bunch length, charge density or beam length of the first beam of charged particles, or with the solid or quasi-solid beam density of the first beam of charged particles, or a combination thereof.

26. The system of claim 25, wherein the at least one tube has a length of at least 0.1 micron up to $10^6$ micron along the longitudinal direction, or wherein oscillation wavelength is at least 10 nm up to 1 micron, or both.

27. The system of claim 22, wherein the second beam of charged particles has said solid or quasi-solid density greater than $10^{22}$ $cm^{-3}$, a bunch length of at least 10 nm up to 30.0 micron, a beam waist radius of 100 nm or less or at least 0.1 up to 100 times the internal radius of the at least one tube, or a combination thereof.

28. The system of claim 22, wherein the nanostructure comprises an array defining a plurality of instances of said at least one tube.

29. The system of claim 28, further comprising at a second array disposed in a stacked orientation with respect to said array, the second array having one or more second tubes configured to extend an effective length of at least one of the plurality of instances of said at least one tube.

30. The system of claim 22, wherein the first beam of charged particles comprise one or more of electrons, positrons, or protons, and further comprising:

a beam focusing mechanism having one or more plasma lenses or magnets configured to focus the beam waist radius of the first beam of charged particles prior to interaction with the nanostructure;

a mechanical stage comprising one or more motors configured to move the nanostructure in one or more directions with respect to the first beam of charged particles, along one or more of three orthogonal axes; and/or a monitoring module with a computer processor, one or more sensors and one or more imagining systems configured to analyze one or more properties of the electrons, positrons or protons, or of the high energy photons, and to and to provide an indication of the properties.

* * * * *